US011242011B2

(12) United States Patent
Cho et al.

(10) Patent No.: US 11,242,011 B2
(45) Date of Patent: Feb. 8, 2022

(54) LUGGAGE BOX APPARATUS FOR VEHICLE

(71) Applicants: Hyundai Motor Company, Seoul (KR); Kia Motors Corporation, Seoul (KR); SEGOS, Incheon (KR); PLAKOR CO., LTD., Hwaseong-si (KR)

(72) Inventors: Min Ho Cho, Suwon-si (KR); Seung Hyeok Chang, Suwon-si (KR); Jang Hyun Cho, Seongnam-si (KR); Dae Min Lee, Incheon (KR); Ji Sun Choi, Hwaseong-si (KR); Seok Heon Yoon, Hwaseong-si (KR); Dong Hee Hong, Hwaseong-si (KR); Youn Woo Park, Hwaseong-si (KR); Jung Whan Kim, Hwaseong-si (KR); Dong Hyun Kim, Yangju-si (KR)

(73) Assignees: Hyundai Motor Company, Seoul (KR); Kia Motors Corporation, Seoul (KR); SEGOS, Incheon (KR); Plakor Co., Ltd., Hwaseong-si (KR)

( * ) Notice: Subject to any disclaimer, the term of this patent is extended or adjusted under 35 U.S.C. 154(b) by 284 days.

(21) Appl. No.: 16/662,608

(22) Filed: Oct. 24, 2019

(65) Prior Publication Data

US 2020/0324706 A1    Oct. 15, 2020

(30) Foreign Application Priority Data

Apr. 10, 2019    (KR) .................. 10-2019-0041975

(51) Int. Cl.
*B60R 7/04*    (2006.01)

(52) U.S. Cl.
CPC ..................... *B60R 7/04* (2013.01)

(58) Field of Classification Search
CPC .... B60R 7/04; B60R 5/04; B60R 7/02; B60R 2011/0036; B60R 2011/0085; B60R 2011/0084
USPC ........................... 296/37.8, 37.1, 37.16, 37.5
See application file for complete search history.

(56) References Cited

U.S. PATENT DOCUMENTS

| 1,406,129 | A | | 2/1922 | Woltz |
| 2,650,871 | A | | 9/1953 | Holderegger |
| 2,788,253 | A | | 4/1957 | Gussack |
| 2,798,445 | A | * | 7/1957 | Gehman ............... B60R 7/087 109/50 |

(Continued)

FOREIGN PATENT DOCUMENTS

| CN | 108407581 A | 8/2018 |
| EP | 3034355 A1 | 6/2016 |

(Continued)

*Primary Examiner* — D Glenn Dayoan
*Assistant Examiner* — E Turner Hicks
(74) *Attorney, Agent, or Firm* — Slater Matsil, LLP

(57) ABSTRACT

A luggage box includes a main box installed to be accommodated in and be drawn from a luggage side trim. A hidden box is connected to the main box so that the hidden box is operated together with the main box. The hidden box is disposed in a row with the main box when the main box is accommodated in the luggage side trim, and is movable to a main box accommodation space to be externally exposed when the main box drawn from the luggage side trim rotates.

16 Claims, 22 Drawing Sheets

(56) References Cited

U.S. PATENT DOCUMENTS

| | | | | |
|---|---|---|---|---|
| 2,867,471 | A * | 1/1959 | Coon, Jr. | B60P 3/36 |
| | | | | 296/156 |
| 3,519,319 | A | 7/1970 | Taylor | |
| 5,263,467 | A * | 11/1993 | Jones | A47J 37/0713 |
| | | | | 126/37 B |
| 5,795,005 | A * | 8/1998 | Garfias | B60R 7/046 |
| | | | | 220/9.2 |
| 5,800,004 | A * | 9/1998 | Ackeret | B60R 7/046 |
| | | | | 296/37.13 |
| 6,263,867 | B1 * | 7/2001 | Skelton | B60R 9/02 |
| | | | | 126/25 R |
| 8,770,643 | B2 | 7/2014 | Auerbach | B60R 16/04 |
| | | | | 296/37.1 |
| 9,016,748 | B1 * | 4/2015 | Ardigo | B60R 7/046 |
| | | | | 296/37.13 |
| 9,598,024 | B2 * | 3/2017 | Kogut | B60R 11/00 |
| 9,944,333 | B1 * | 4/2018 | Stojkovic | B60R 5/006 |
| 10,682,942 | B2 * | 6/2020 | Tollefson | A23G 9/288 |
| 11,128,448 | B1 * | 9/2021 | Bernat | H04L 9/0833 |
| 2009/0189404 | A1 * | 7/2009 | Anderson | B60R 9/02 |
| | | | | 296/37.6 |
| 2012/0299324 | A1 * | 11/2012 | Langenbacher | B60N 3/101 |
| | | | | 296/37.13 |
| 2013/0212949 | A1 | 8/2013 | Doll | |
| 2017/0253196 | A1 | 9/2017 | Barrow et al. | |
| 2018/0222293 | A1 * | 8/2018 | Thomas | B60R 7/046 |
| 2019/0232851 | A1 | 8/2019 | Frederick et al. | |
| 2019/0248294 | A1 * | 8/2019 | Persson | B60R 7/04 |
| 2020/0130587 | A1 * | 4/2020 | Cho | B60R 5/04 |
| 2020/0324705 | A1 * | 10/2020 | Lee | B60R 7/02 |
| 2020/0324706 | A1 | 10/2020 | Cho et al. | |

FOREIGN PATENT DOCUMENTS

| | | |
|---|---|---|
| EP | 3147160 A2 | 3/2017 |
| FR | 2900700 A1 | 11/2007 |
| FR | 2979303 A1 | 3/2013 |
| JP | 2005247238 A | 9/2005 |
| KR | 20030008913 A | 1/2003 |
| KR | 200331590 Y1 | 11/2003 |

* cited by examiner

LUGGAGE BOX APPARATUS FOR VEHICLE

CROSS-REFERENCE TO RELATED APPLICATIONS

This application claims priority to Korean Patent Application No. 10-2019-0041975, filed on Apr. 10, 2019, which application is hereby incorporated herein by reference.

TECHNICAL FIELD

The present disclosure relates to a luggage box apparatus for a vehicle.

BACKGROUND

A recreational vehicle (RV) (e.g., sport utility vehicle, multi-purpose vehicle, and the like) is provided with a luggage room for loading freight behind a rear seat. A luggage side trim constituting the luggage room has a luggage box provided with a tray which is simply opened toward the luggage room.

Separation of items accommodated in the tray is prevented by a net covering a front side of the tray. In such a tray which is simply opened, a large amount of items may not be accommodated due to a generally small accommodation space of the tray, and in particular, an unused space of a side portion of a luggage room (e.g., a space present when optional specifications such as a rear air conditioner, a woofer speaker, and the like are not applied) may not be sufficiently utilized, and a separate net is required to prevent the separation of the items accommodated in the tray.

The contents described as the related art have been provided only for assisting in the understanding for the background of the present disclosure and should not be considered as corresponding to the related art known to those skilled in the art.

SUMMARY

The present disclosure relates to a luggage box apparatus for a vehicle. Particular embodiments relate to a luggage box apparatus for a vehicle having an improved structure capable of optimally utilizing an unused space of a side portion of a luggage room.

Embodiments of the present disclosure provide a luggage box apparatus for a vehicle including a main box and a hidden box connected to the main box so that the hidden box is operated together with the main box, in which space utilization and accommodations of objects may be improved by optimally utilizing an unused space of a side portion of a luggage room. For example, cost reduction may be realized by using no separate component such as a net for preventing separation of items.

According to an embodiment of the present disclosure, a luggage box apparatus for a vehicle includes a main box installed to be accommodated in and be drawn from a luggage side trim. A hidden box is connected to the main box so that the hidden box is operated together with the main box, disposed in a row with the main box when the main box is accommodated in the luggage side trim, and moving to a main box accommodation space to be externally exposed when the main box drawn from the luggage side trim rotates.

The main box may include a main box housing sliding linearly and rotating with respect to the luggage side trim and a main moving box provided to be positioned in the main box housing and be linearly movable, and operated so as to protrude from the main box housing or to be inserted into the main box housing when the main box housing rotates.

The luggage box apparatus for a vehicle may further include a center frame fixedly installed at one side of the main box accommodation space in the luggage side trim. A rotating shaft traverses the center frame in a vertical direction and has opposite ends coupled to the center frame. An upper rail and a lower rail are coupled to an upper portion and a lower portion of the main box, respectively and guide linear sliding of the main box. A center hinge bracket is rotatably coupled to the rotating shaft and connecting the upper rail and the lower rail to each other.

The upper rail may include an upper fixed rail and an upper moving rail, and the lower rail may include a lower fixed rail and a lower moving rail. The center hinge bracket may include an upper bracket coupled to the upper fixed rail and a lower bracket coupled to the lower fixed rail.

A rail bracket may be coupled to the upper moving rail and the lower moving rail so as to connect the upper moving rail and the lower moving rail to each other. The rail bracket and the main box housing may be coupled to each other.

A guide roller may be rotatably coupled to the upper moving rail. A roller guide may be fixedly coupled to the center frame, the roller guide guiding a movement of the guide roller while being in contact with the guide roller when the upper moving rail moves along the upper fixed rail.

A circular groove for limiting a movement of the upper moving rail may be formed at one end of the roller guide as the guide roller is inserted into the one end of the roller guide. The guide roller may move along the circular groove while being in contact with the circular groove when the center hinge bracket coupled to the upper rail rotates about the rotating shaft.

An upper avoidance groove and a lower avoidance groove which are concave may be formed in an upper surface and a lower surface of the hidden box, respectively, and when the center hinge bracket rotates about the rotating shaft, a portion of the upper fixed rail and a portion of the upper bracket may be inserted into the upper avoidance groove, and a portion of the lower fixed rail and a portion of the lower bracket may be inserted into the lower avoidance groove, to avoid interference with the hidden box.

The luggage box apparatus for a vehicle may further include a hidden box connection link having both ends rotatably hinge-coupled to a lower surface of the hidden box and the lower bracket. A side trim guide hole is formed in a bottom of the luggage side trim corresponding to the main box accommodation space to be extended in a direction in which the main box slides linearly. A main box connection link has one end inserted into the side trim guide hole to be movable along the side trim guide hole. A housing guide hole is formed in the main box housing to be extended in a direction in which the main moving box moves with respect to the main box housing. A main box extension link has one and rotatably hinge-coupled to the main box connection link and the other end penetrating through the housing guide hole and rotatably hinge-coupled to the main moving box.

The hidden box may be positioned in a hidden box accommodation space of the luggage side trim when the main box slides linearly with respect to the luggage side trim to be accommodated in and be drawn from the luggage side trim as the main box connection link moves along the side trim guide hole. When the main box drawn from the luggage side trim rotates as the center hinge bracket rotates about the rotating shaft, the hidden box positioned in the hidden box accommodation space may move to the main box accommodation space by a movement of the hidden box connection link, such that the hidden box is externally exposed through an opening of the luggage side trim, the main box connection link and the main box extension link are rotated and unfolded so that the main box connection link and the main box extension link are formed in a straight line, and the main moving box moves linearly with respect to the main box housing to partially protrude from the main box housing.

The luggage box apparatus for a vehicle may further include a hidden box connection link having both ends rotatably hinge-coupled to a lower surface of the hidden box and the lower bracket. A main box connection link has one and rotatably hinge-coupled to the hidden box connection link. A housing guide hole is formed in the main box housing to be extended in a direction in which the main moving box moves with respect to the main box housing. A main box extension link has one and rotatably hinge-coupled to the other end of the main box connection link and the other end penetrating through the housing guide hole and rotatably hinge-coupled to the main moving box.

The hidden box may be positioned in a hidden box accommodation space of the luggage side trim, and the main box connection link and the main box extension link may rotate at an acute angle for a linear movement of the main box when the main box slides linearly with respect to the luggage side trim to be accommodated in and be drawn from the luggage side trim. When the main box drawn from the luggage side trim rotates as the center hinge bracket rotates about the rotating shaft, the hidden box positioned in the hidden box accommodation space may move to the main box accommodation space by a movement of the hidden box connection link, such that the hidden box is externally exposed through an opening of the luggage side trim, the main box connection link and the main box extension link are rotated and unfolded so that the main box connection link and the main box extension link are formed in a straight line, and the main moving box moves linearly with respect to the main box housing to partially protrude from the main box housing.

The luggage box apparatus for a vehicle may further include a holder operated to be inserted into the luggage side trim through the main box and protrude outwardly of the luggage side trim.

The luggage box apparatus for a vehicle may further include a holder fixing rail fixedly coupled to the rail bracket in a direction in which the main box slides linearly with respect to the luggage side trim. A holder moving rail moves along the holder fixing rail and is coupled to the holder. The holder is rotatably hinge-coupled to the holder moving rail so that an angle between the holder and the holder moving rail is adjusted.

The main box may be positioned in front of a seat, the hidden box may be positioned behind the main box, the main box drawn from the luggage side trim may rotate forward, and the hidden box may move to the main box accommodation space positioned in front of the hidden box to be externally exposed through an opening of the luggage side trim when the main box rotates.

The main box may be positioned behind a seat, the hidden box may be positioned in front of the main box, the main box drawn from the luggage side trim may rotate forward, and the hidden box may move to the main box accommodation space positioned behind the hidden box to be externally exposed through an opening of the luggage side trim when the main box rotates.

DETAILED DESCRIPTION OF ILLUSTRATIVE EMBODIMENTS

Figure 1A:
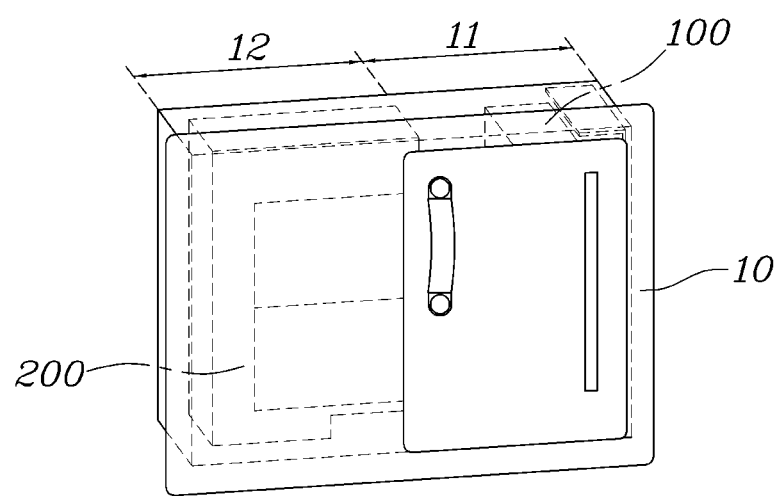
FIGS. 1A to 1C and 2A to 2C are perspective views and plan views of a luggage box apparatus for a vehicle positioned between a front seat and a rear seat according to an embodiment of the present disclosure.

Hereinafter, a luggage box apparatus for a vehicle according to a preferred embodiment of the present disclosure will be described with reference to FIGS. 1A to 20C.

A luggage box apparatus for a vehicle according to the present disclosure includes a main box 100 and a hidden box 200, as illustrated. The main box 100 and the hidden box 200 are connected to each other so that the hidden box 200 may be operated together with the main box 100 when the main box 100 is operated.

The main box 100 and the hidden box 200 are installed in a state where they are accommodated in a luggage side trim 10. The main box 100 is accommodated in a main box accommodation space 11 of the luggage side trim 10. The hidden box 200 is accommodated in a hidden box accommodation space 12 of the luggage side trim 10.

The main box 100 and the hidden box 200 which are accommodated in the luggage side trim 10 are disposed in a row. The main box 100 is accommodated in or is drawn from the luggage side trim 10 as the main box 100 slides linearly with respect to the luggage side trim 10. Accordingly, the hidden box 200 moves from the hidden box accommodation space 12 to the main box accommodation space 11 when the main box 100 drawn from the luggage side trim 10 rotates, such that the hidden box 200 is externally exposed through an opening 13 of the luggage side trim 10.

The hidden box accommodation space 12 of the luggage side trim 10 is an unused space (a space present when optional specifications such as a rear air conditioner, a woofer speaker, and the like are not applied) of a side portion of a luggage room. The hidden box 200 may be accommodated and stored by utilizing the hidden box accommodation space 12 corresponding to the unused space, resulting in significant improvement of space utilization.

In addition, according to an embodiment of the present disclosure, since items may be accommodated and stored by utilizing the main box 100 and the hidden box 200, an amount of items to be stored may be increased, which improves accommodability.

In addition, according to an embodiment of the present disclosure, even though a net is not used unlike in the related art, separation of the items accommodated in the main box 100 and the hidden box 200 may be prevented, resulting in cost reduction.

In addition, according to an embodiment of the present disclosure, only lines of the main box 100 are visible from the outside when the main box 100 and the hidden box 200 are accommodated in the luggage side trim 10, such that exposure may be minimized in an accommodated state and improvement of aesthetic appearance due to the minimized exposure may be realized.

Figure 1B:
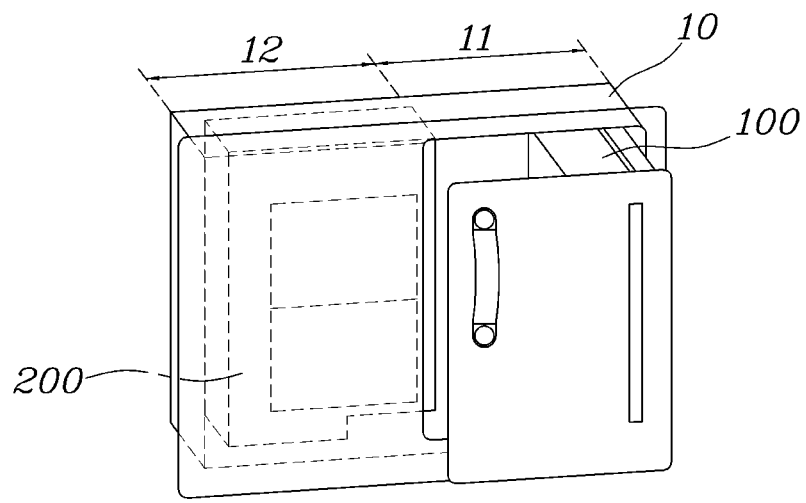
Figure 1C:
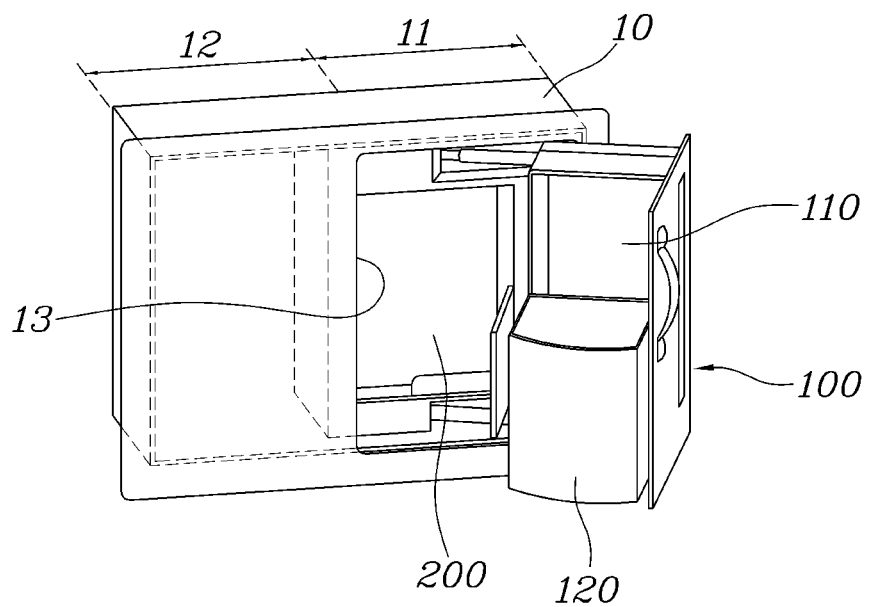
Figure 2A:
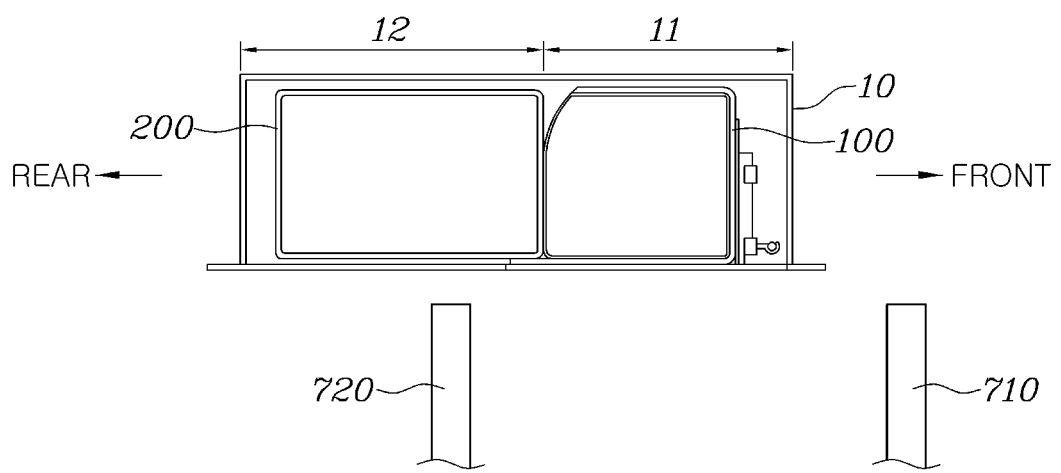
Figure 2B:
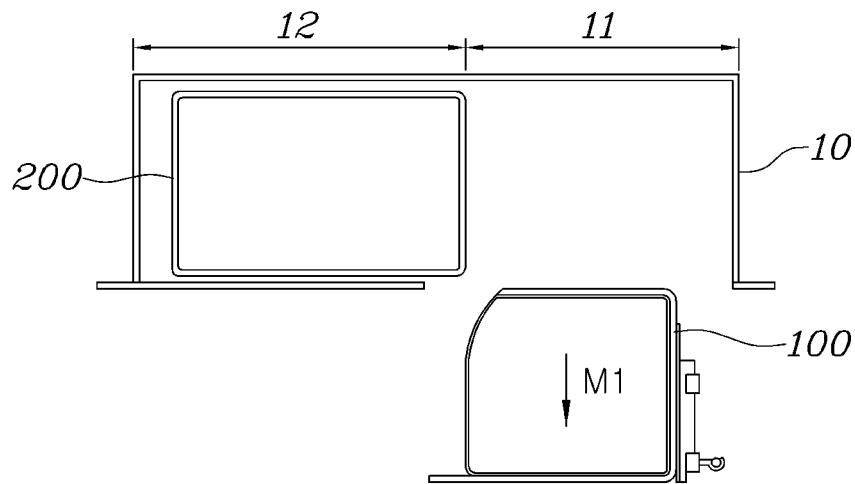
Figure 2C:
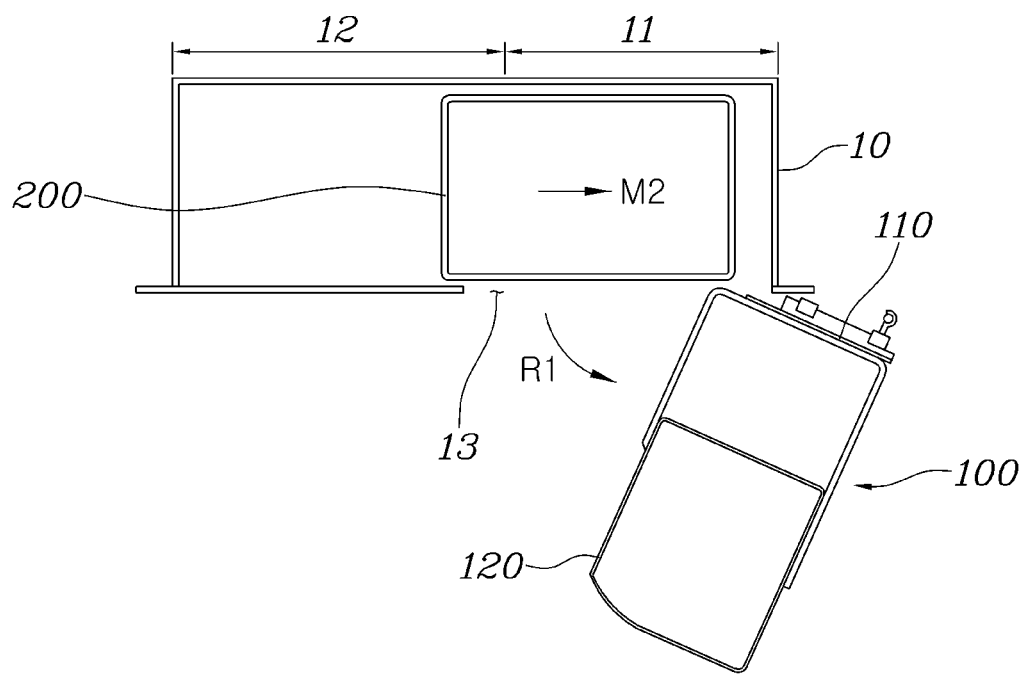

FIGS. 1A to 2C are perspective views and plan views illustrating overall operation of the main box 100 and the hidden box 200. FIGS. 1A and 2A illustrate a state where the main box 100 and the hidden box 200 are accommodated in the main box accommodation space 11 and the hidden box accommodation space 12 of the luggage side trim 10, respectively. FIGS. 1B and 2B illustrate a state where the main box 100 slides linearly, such that the main box 100 is in a state where it is drawn from the luggage side trim 10 (arrow M1). FIGS. 1C and 2C illustrate a state where the hidden box 200 moves from the hidden box accommodation space 12 to the main box accommodation space 11 as the main box 100 drawn from the luggage side trim 10 rotates (arrows R1 and M2).

The main box 100 according to the present disclosure includes: a main box housing no sliding linearly and rotating with respect to the luggage side trim 10; and a main moving box 120 provided to be positioned in the main box housing no and be linearly movable, and operated so as to protrude from the main box housing no or to be inserted into the main box housing 110 when the main box housing 110 rotates.

Figure 3:
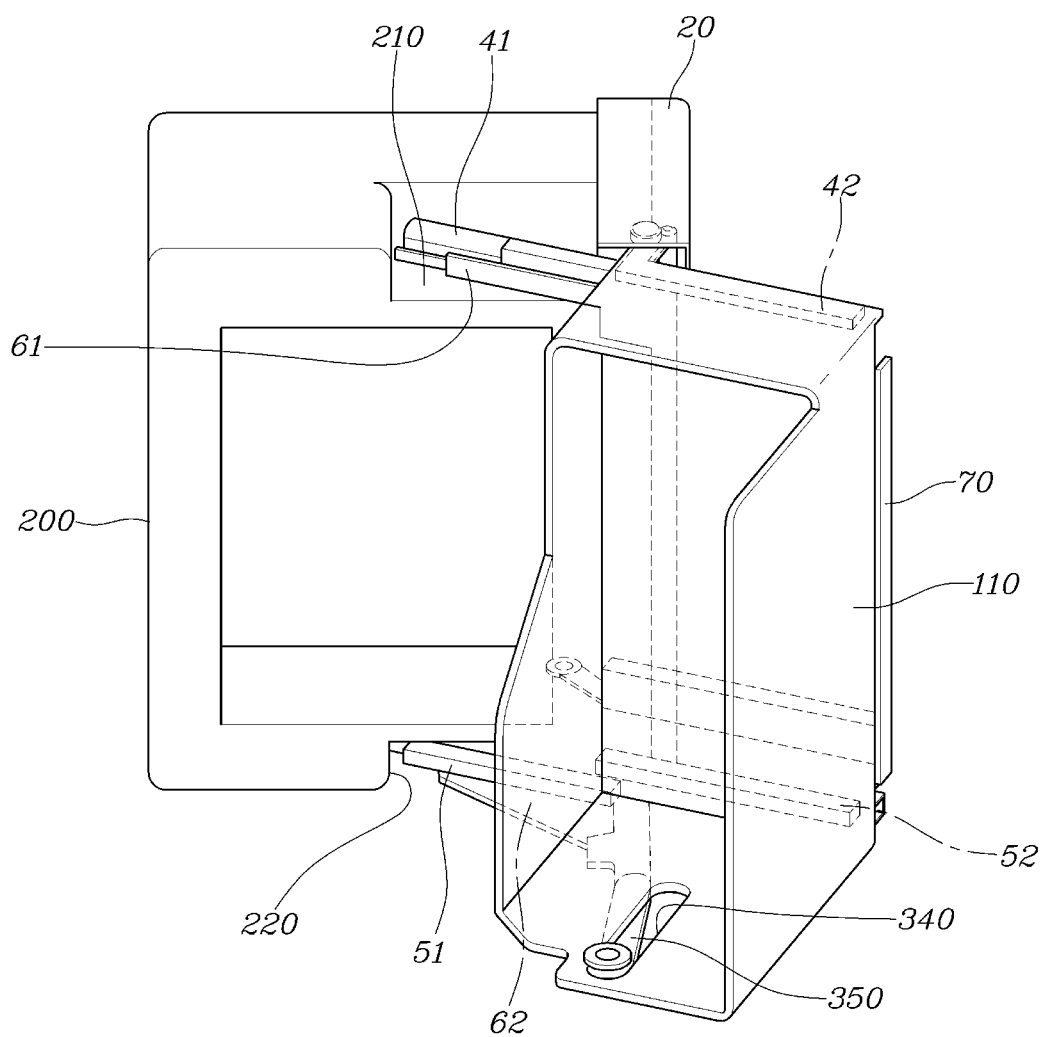
FIG. 3 is a view illustrating a state where a luggage side trim is removed in the state of FIG. 1C.
Figure 4:
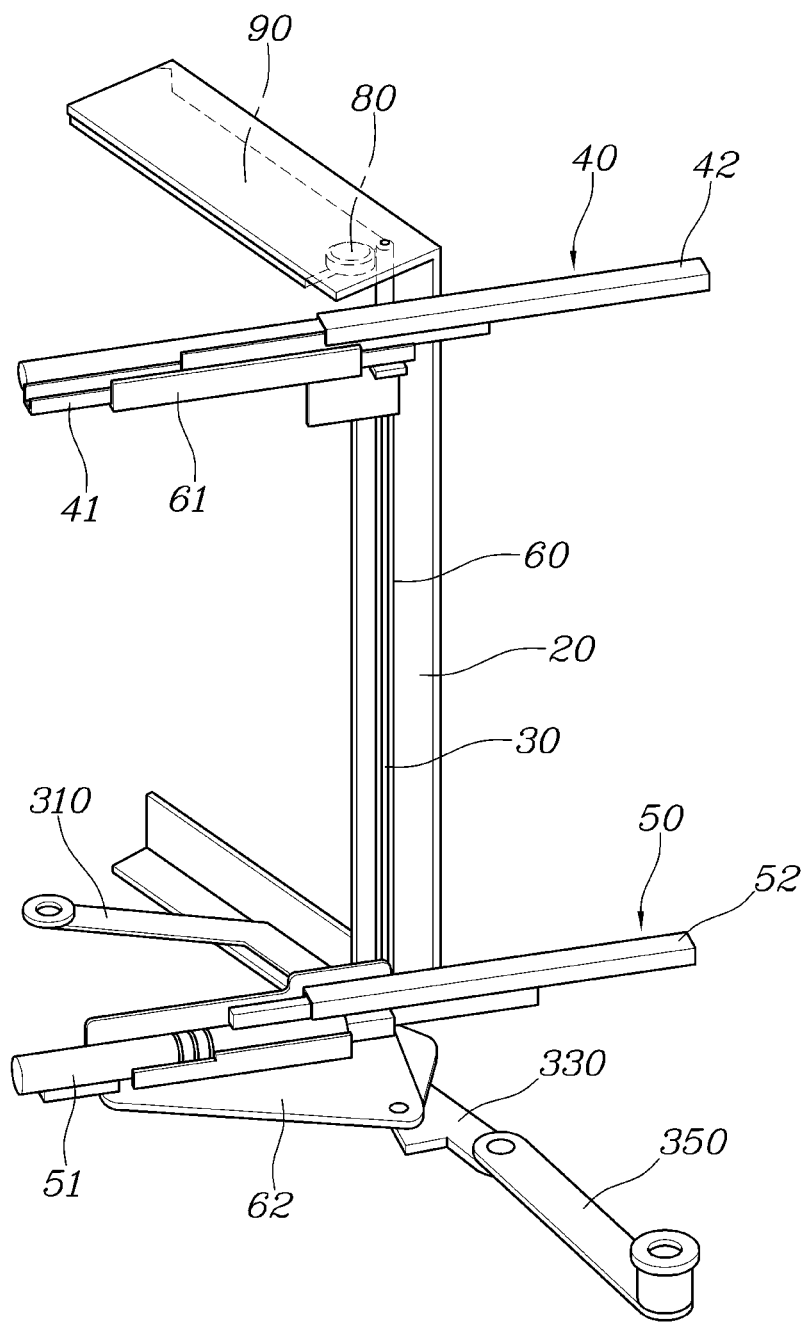
FIG. 4 is a view illustrating a state where the main box and the hidden box are removed from FIG. 3.
Figure 5:
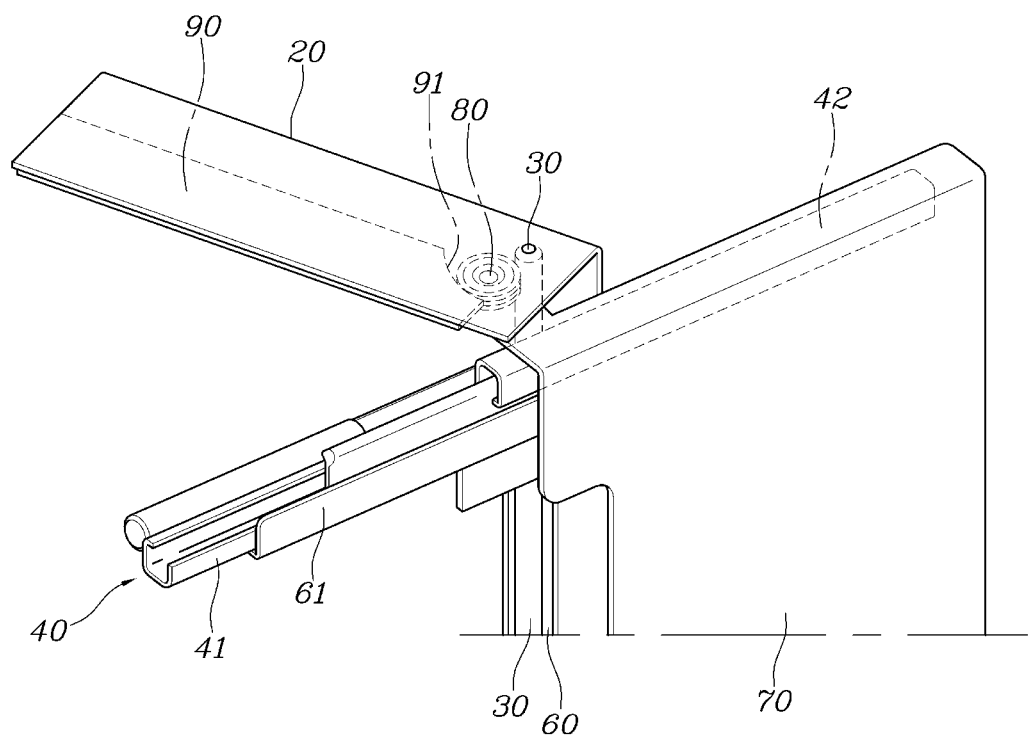
FIG. 5 is a view illustrating a state where a rail bracket is coupled to an upper moving rail and a lower moving rail so as to connect the upper moving rail and the lower moving rail to each other.
Figure 6:
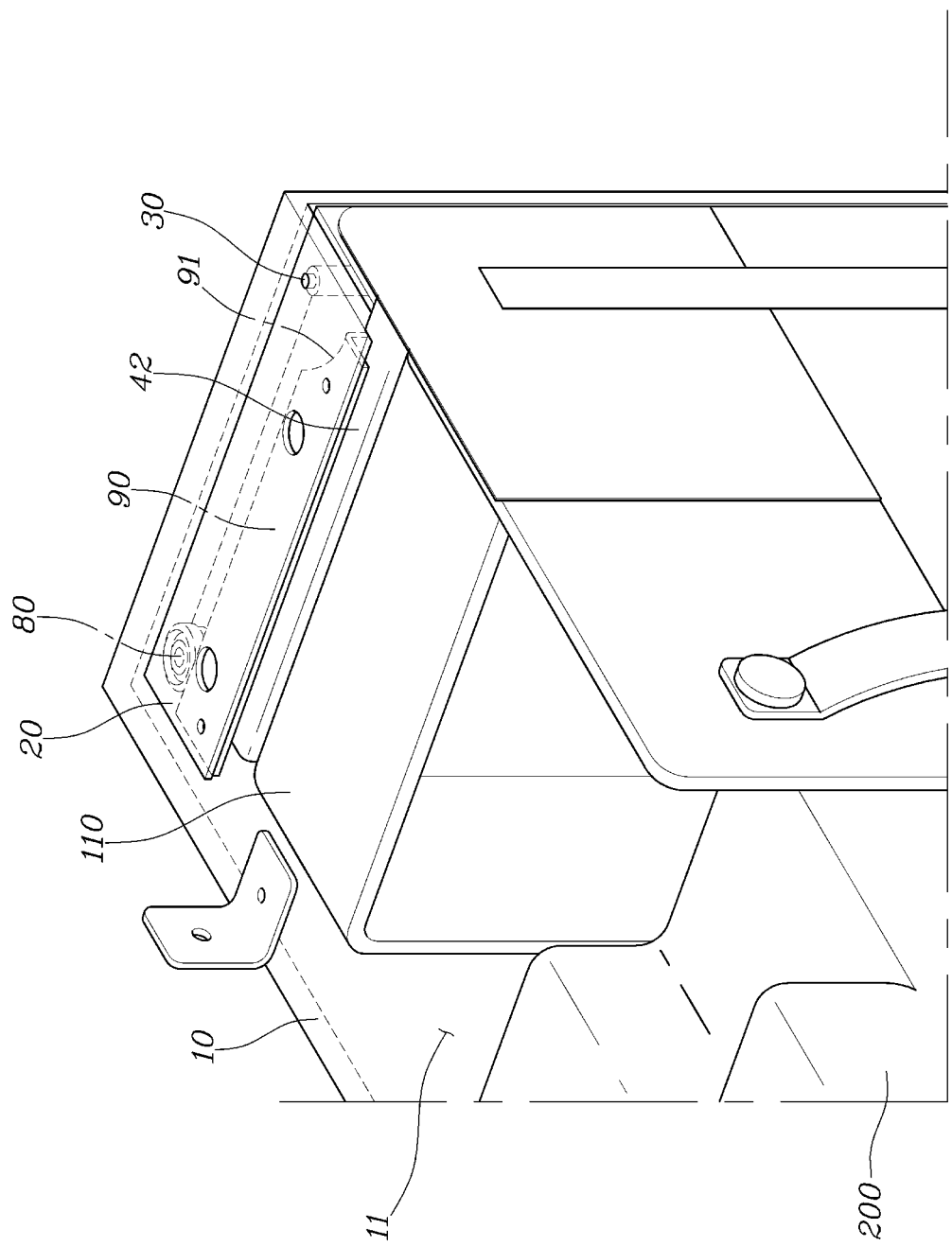
FIGS. 6 to 9 are views for describing components provided at an upper portion of a main box.
Figure 7:
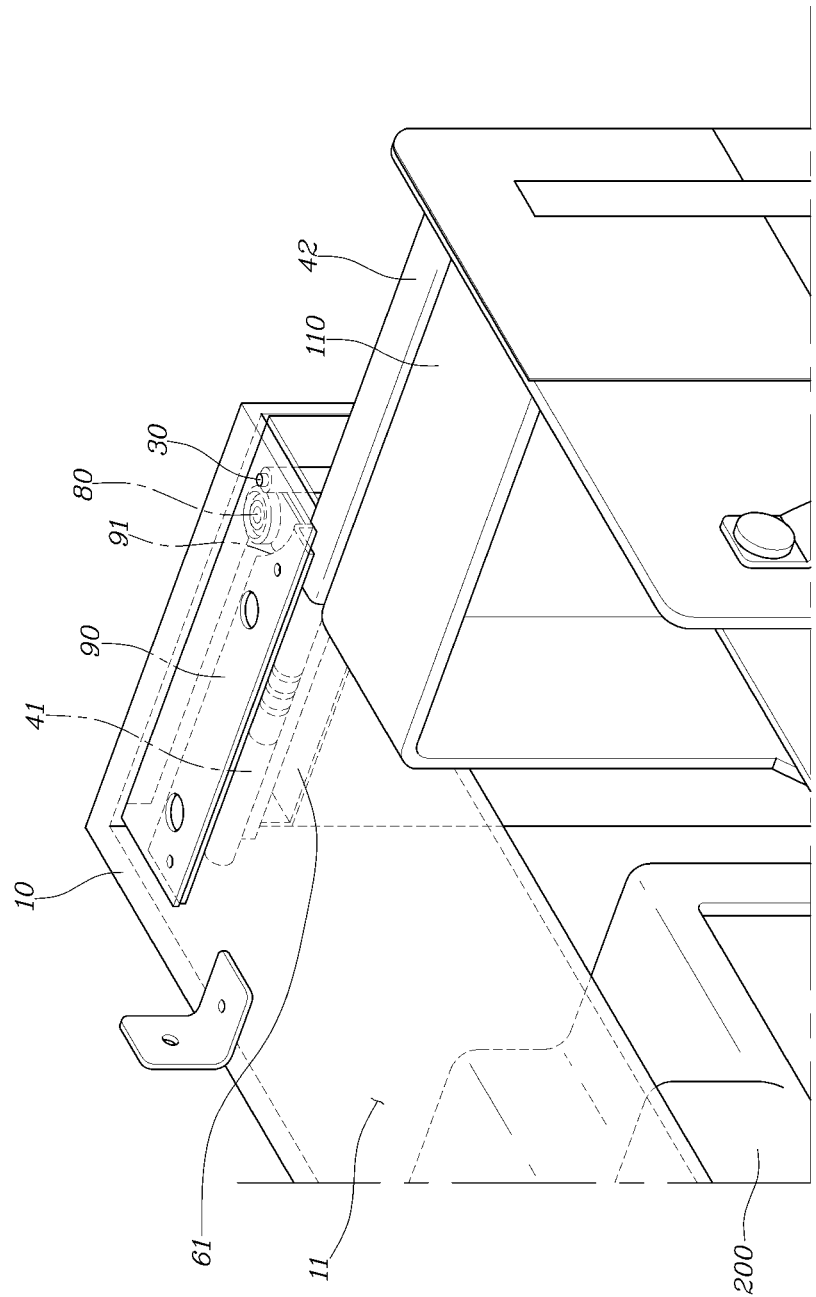
Figure 8:
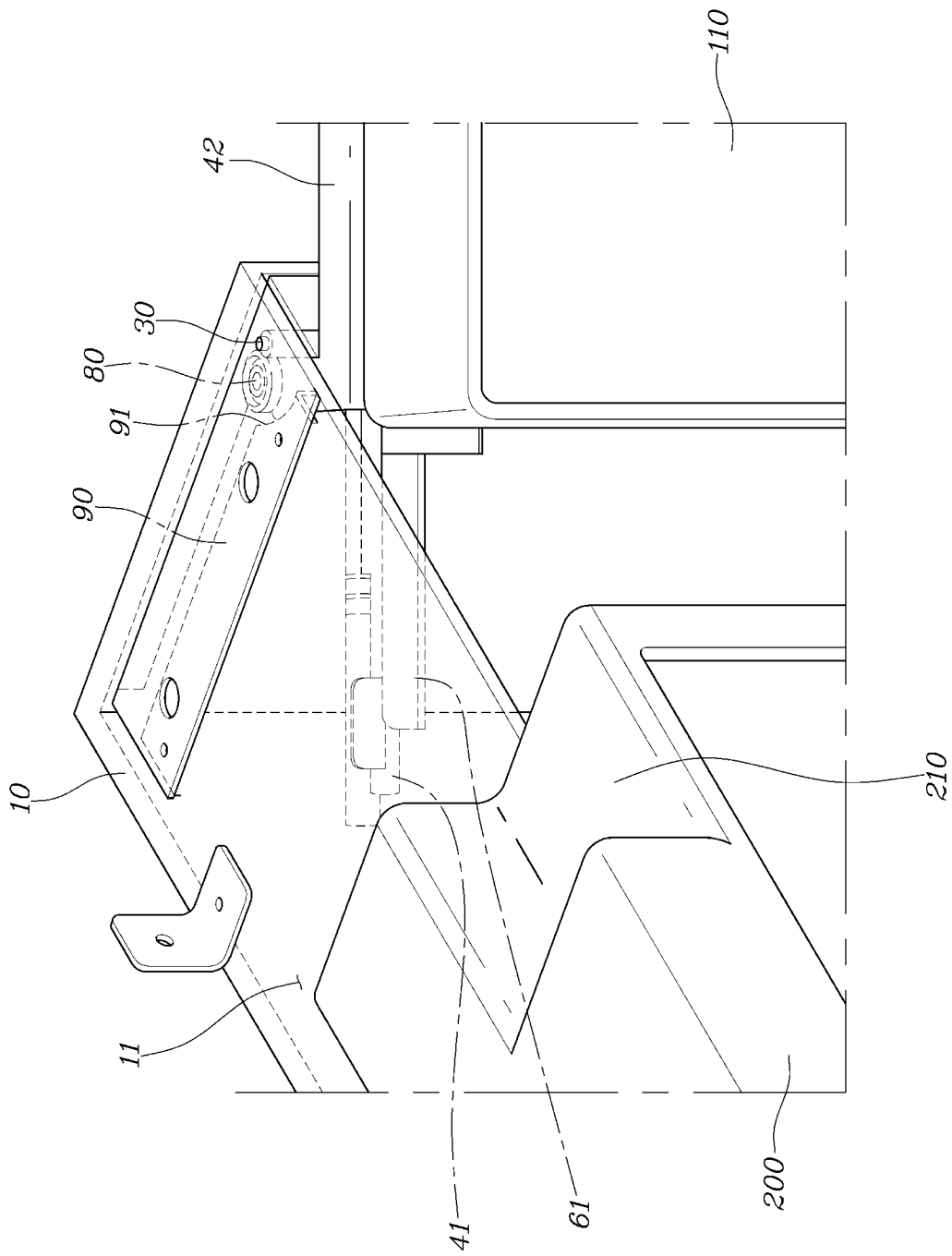
Figure 9:
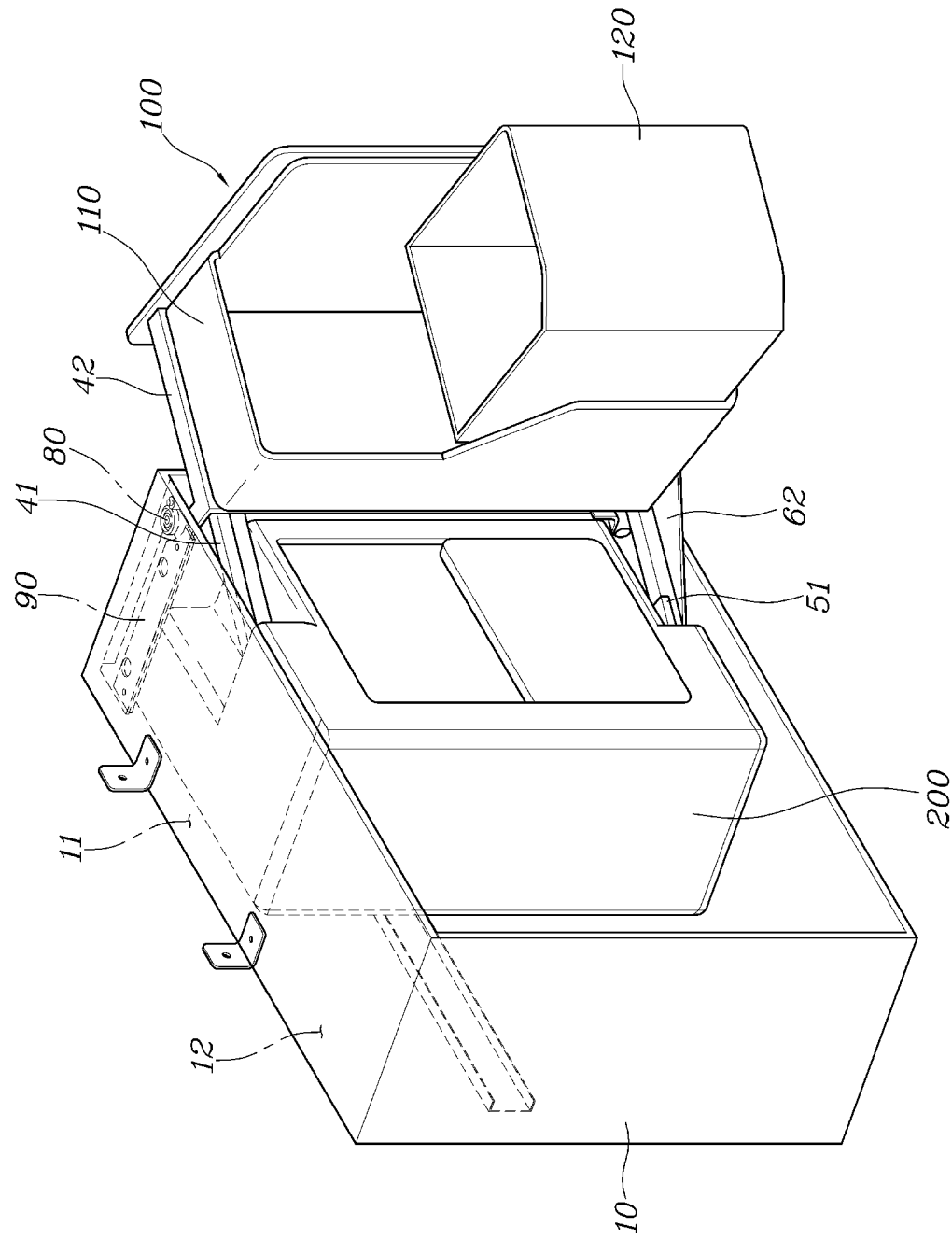

FIGS. 3 to 5 illustrate a configuration of mechanical components enabling operations of the main box 100 and the hidden box 200. FIG. 3 illustrates a state where the luggage side trim 10 is removed in the state of FIG. 1C. FIG. 4 illustrates a state where the main box 100 and the hidden box 200 are removed from FIG. 3. FIG. 5 illustrates a state where a rail bracket is coupled to an upper moving rail and a lower moving rail so as to connect the upper moving rail and the lower moving rail to each other.

In addition, FIGS. 6 to 9 are views for describing mechanical components provided at an upper portion of the main box 100, which enable the operations of the main box 100 and the hidden box 200.

First, the components provided at the upper portion of the main box 100 will be described with reference to FIGS. 3 to 9.

The luggage box apparatus for a vehicle further includes: a center frame 20 fixedly installed at one side of the main box accommodation space 11 in the luggage side trim 10; a rotating shaft 30 traversing the center frame 20 in a vertical direction and having opposite ends coupled to the center frame 20; an upper rail 40 and a lower rail 50 coupled to one side of an upper portion and one side of a lower portion of the main box 100, respectively, and guiding linear sliding of the main box 100; and a center hinge bracket 60 rotatably coupled to the rotating shaft 30 and connecting the upper rail 40 and the lower rail 50 to each other.

The center frame 20 has an upper portion and a lower portion, and a middle portion connecting the upper and lower portions to each other in a vertical direction. The upper portion and the lower portion of the center frame 20 are installed to be extended in a direction in which the main box 100 slides linearly from the luggage side trim 10.

The rotating shaft 30 is installed along the middle portion of the center frame 20 in the vertical direction. An upper end and a lower end of the rotating shaft 30 are fixedly coupled to the upper portion and the lower portion of the center frame 20, respectively.

The upper rail 40 includes an upper fixed rail 41 and an upper moving rail 42 and the lower rail 50 includes a lower fixed rail 51 and a lower moving rail 52.

In addition, an upper bracket 61 coupled to the upper fixed rail 41 and a lower bracket 62 coupled to the lower fixed rail 51 are provided at an upper end and a lower end of the center hinge bracket 60, respectively. A rail bracket 70 is coupled to the center hinge bracket 60 so as to connect the upper moving rail 42 and the lower moving rail 52 to each other. The rail bracket 70 is integrally coupled to the main box housing no constituting the main box 100.

A guide roller 80 is rotatably coupled to the upper moving rail 42. A roller guide 90 is fixedly coupled to the upper portion of the center frame 20, the roller guide 90 guiding a movement of the guide roller 80 while being in contact with the guide roller 80 when the upper moving rail 42 moves along the upper fixed rail 41.

A circular groove 91 for limiting a movement of the upper moving rail 42 is formed at one end of the roller guide 90 as the guide roller is inserted into the one end of the roller guide. The guide roller 80 moves along the circular groove 91 while being in contact with the circular groove 91 when the center hinge bracket 60 coupled to the upper rail 40 rotates about the rotating shaft 30, such that the main box 100 may stably rotate.

In addition, an upper avoidance groove 210 and a lower avoidance groove 220 which are concave are formed in an upper surface and a lower surface of the hidden box 200, respectively.

A portion of the upper fixed rail 41 and a portion of the upper bracket 61 are inserted into the upper avoidance groove 210, and a portion of the lower fixed rail 51 and a portion of the lower bracket 62 are inserted into the lower avoidance groove 220 when the center hinge bracket 60 rotates about the rotating shaft 30, such that the hidden box 200 may smoothly move from the hidden box accommodation space 12 to the main box accommodation space 11 without interference with peripheral components.

Operations of the components provided at the upper portion of the main box 100 will be described based on the structure described hereinabove.

In the state where the main box 100 and the hidden box 200 are accommodated in the luggage side trim 10 as illustrated in FIGS. 1A and 2A, when a user presses and operates the main box 100, a locked state of the main box 100 is released, such that the upper moving rail 42 moves linearly along the upper fixed rail 41 by a spring force, and the main box 100 connected to the upper fixed rail 41 through the rail bracket 70 slides in a linear direction, such that the main box 100 is in a state where it is drawn from the luggage side trim 10, as illustrated in FIGS. 1B and 2B.

When the user pushes the main box 100 drawn from the luggage side trim 10 as illustrated in FIGS. 1B and 2B, the center hinge bracket 60 rotates about the rotating shaft 30, the upper rail 40 coupled to the upper bracket 61 rotates together with the center hinge bracket 60 when the center hinge bracket 60 rotates, and the main box 100 coupled to the upper rail 40 through the rail bracket 70 rotates together with the upper rail 40, such that the main box 100 is in the states of FIGS. 1C and 2C.

Since an accommodation operation is opposite to the operation described above, the description thereof will be omitted.

Next, components provided at the lower portion of the main box 100 and operations thereof will be described with reference to FIGS. 3 and 4 and 10 to 13.

The luggage box apparatus for a vehicle according to the present disclosure further includes: a hidden box connection link 310 having both ends rotatably hinge-coupled to a lower surface of the hidden box 200 and the lower bracket 62 constituting the center hinge bracket 60; a side trim guide hole 320 formed in a bottom of the luggage side trim 10 corresponding to the main box accommodation space 11 to be extended in a direction in which the main box 100 slides linearly; a main box connection link 330 having one end inserted into the side trim guide hole 320 to be movable along the side trim guide hole 320; a housing guide hole 340 formed in the main box housing 110 to be extended in a direction in which the main moving box 120 moves with respect to the main box housing 110 constituting the main box 100; and a main box extension link 350 having one end rotatably hinge-coupled to the main box connection link 330 and the other end penetrating through the housing guide hole 340 and rotatably hinge-coupled to the main moving box 120.

The hidden box connection link 310 having a W shape which is bent several times is illustrated by way of example.

Figure 10:
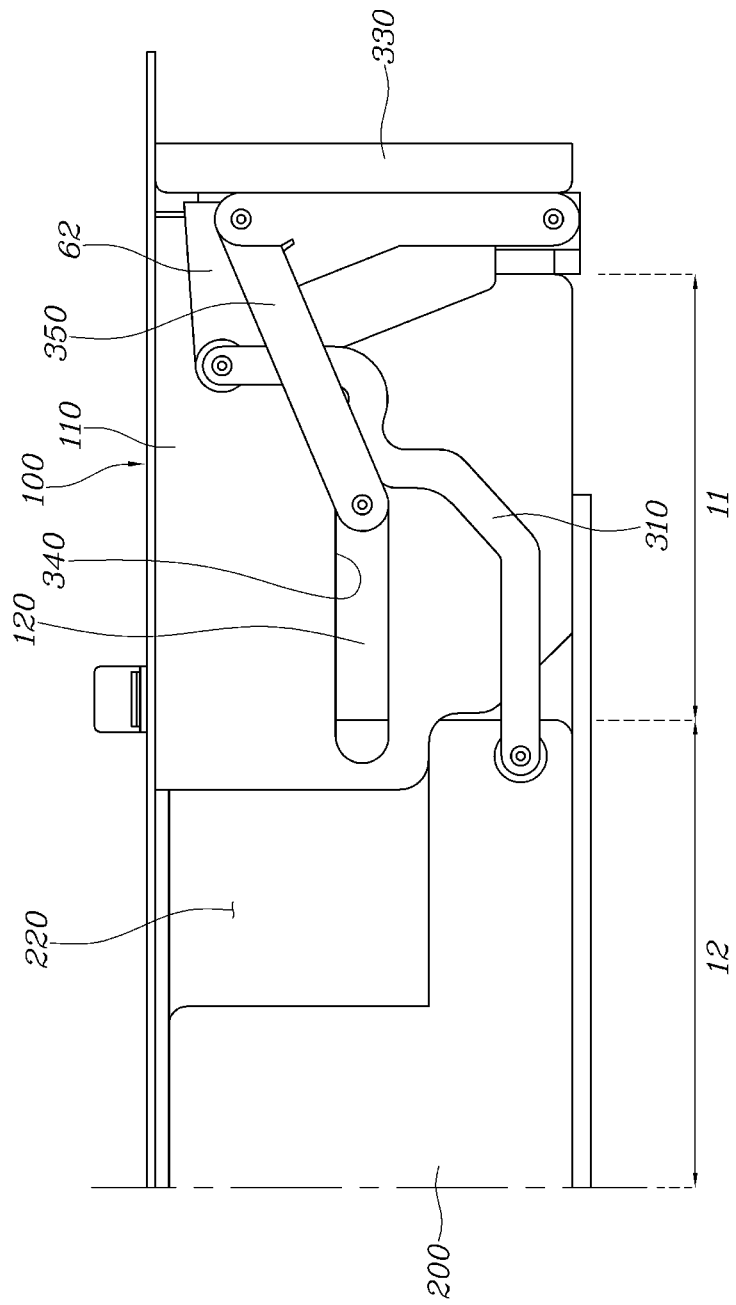
FIGS. 10 to 13 are views for describing components of an embodiment provided at a lower portion of a main box.
Figure 11:
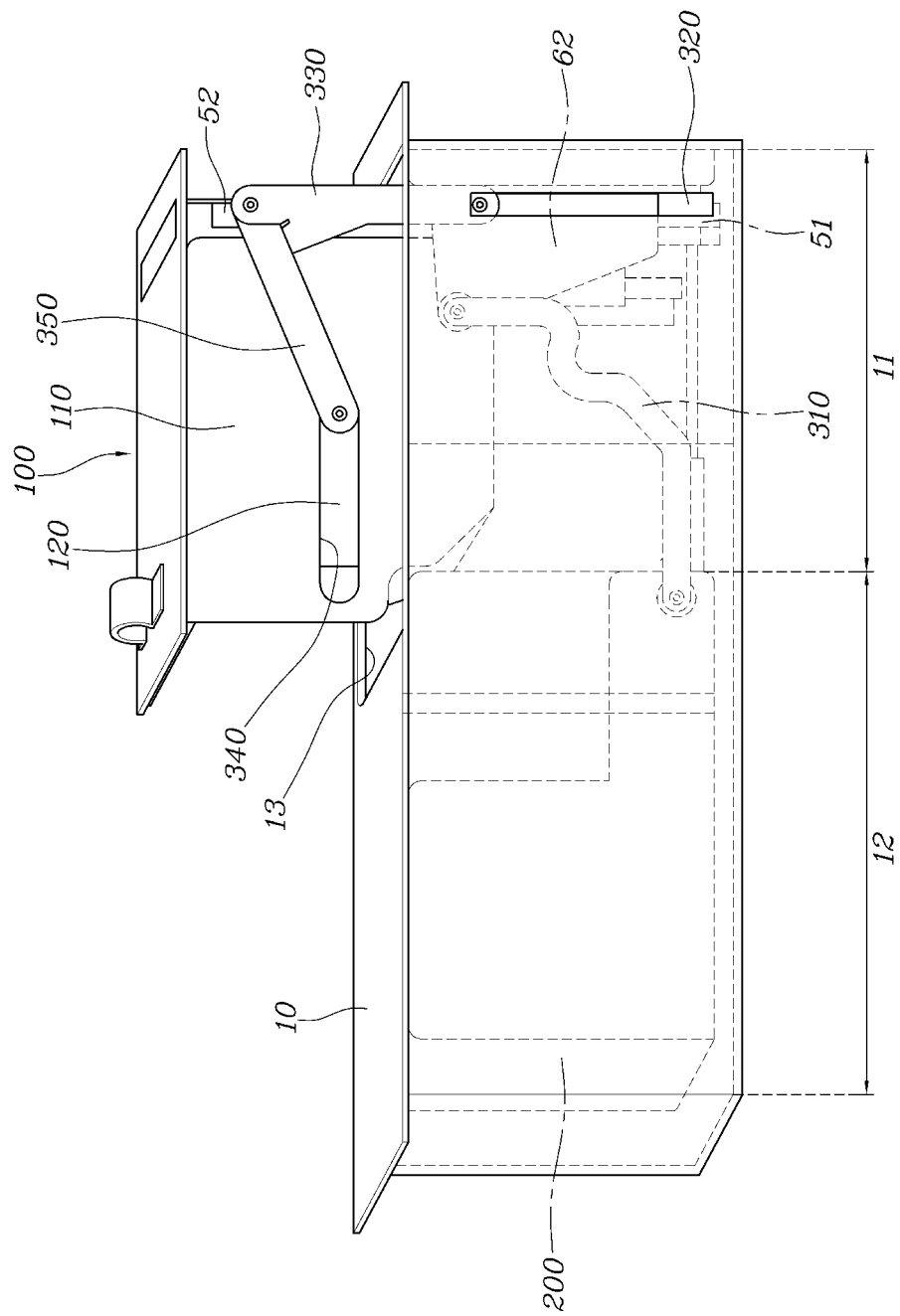
Figure 12:
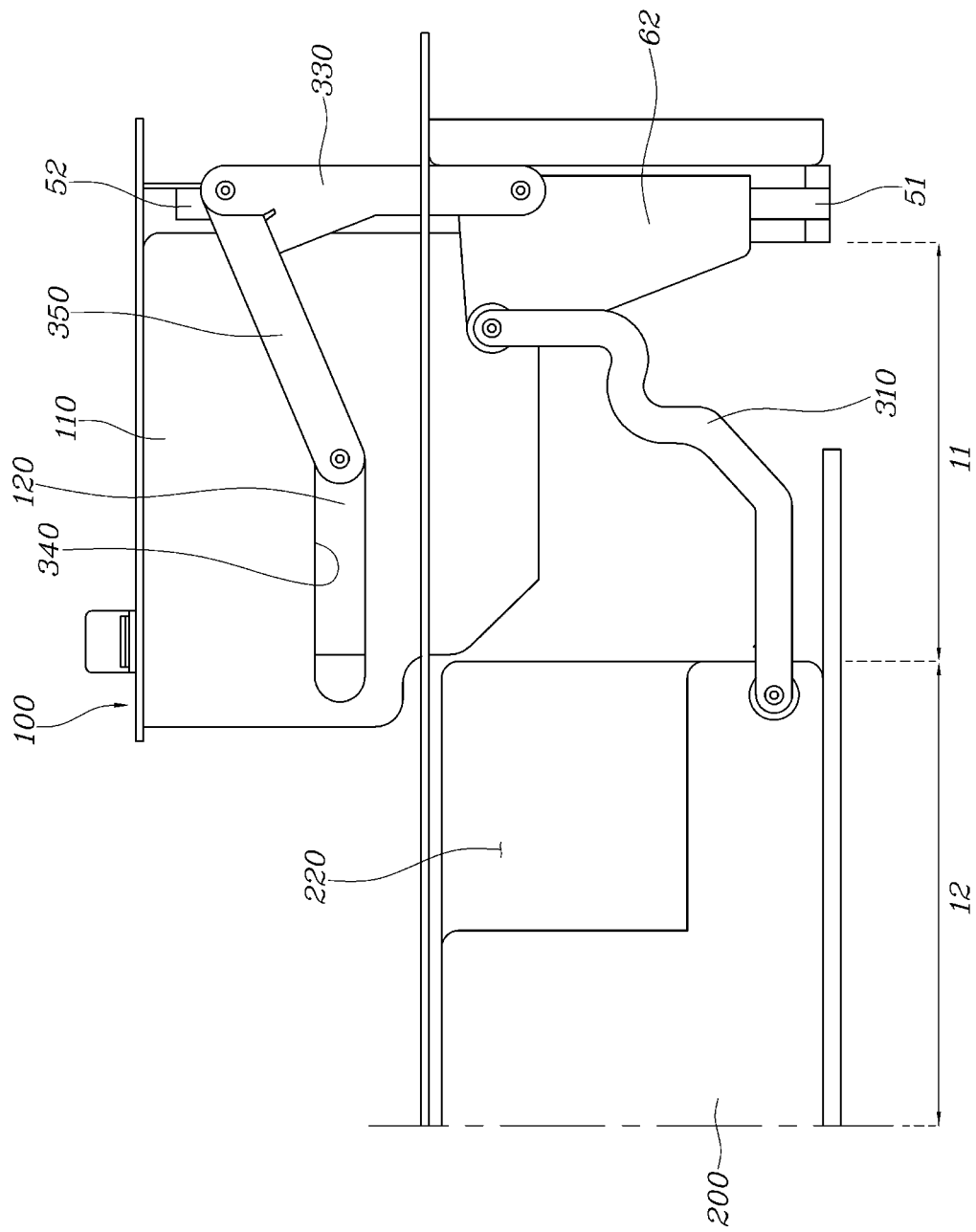

In the state where the main box 100 and the hidden box 200 are accommodated in the luggage side trim 10 as illustrated in FIG. 10, when a user presses and operates the main box 100, the locked state of the main box 100 is released, such that the lower moving rail 52 moves linearly along the lower fixed rail 51 by a spring force, and the main box 100 connected to the lower fixed rail 51 through the rail bracket 70 slides in a linear direction, such that the main box 100 is in a state where it is drawn from the luggage side trim 10, as illustrated in FIGS. 11 and 12.

Even though the main box 100 slides in the linear direction, such that the main box 100 is in the state where the main box 100 is drawn from the luggage side trim 10, the hidden box 200 is kept in a state where hidden box 200 is positioned in the hidden box accommodation space 12 of the luggage side trim 10.

Figure 13:
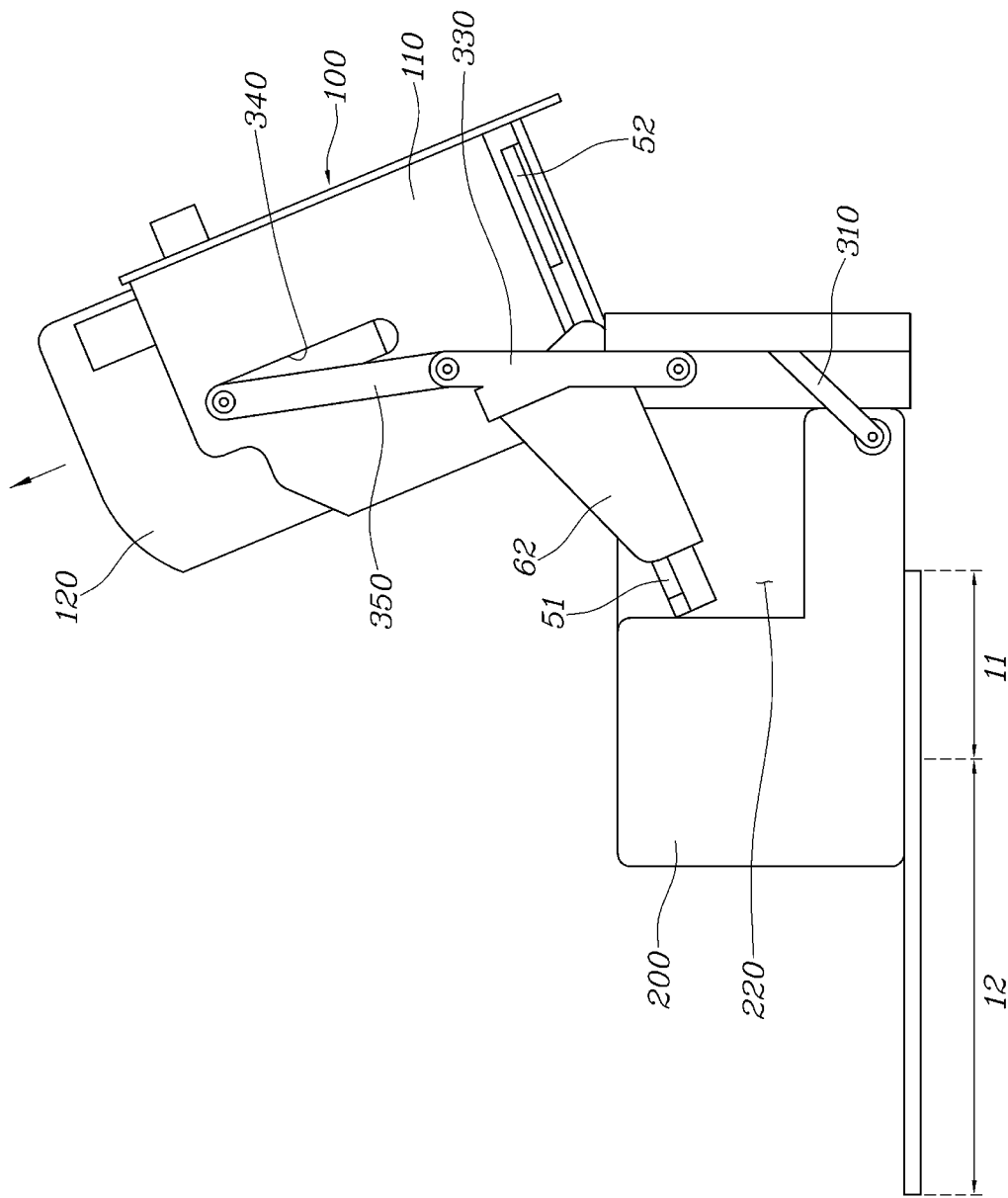

When the user pushes the main box 100 drawn from the luggage side trim 10, the center hinge bracket 60 rotates about the rotating shaft 30, the lower rail 50 coupled to the lower bracket 62 rotates together with the center hinge bracket 60 when the center hinge bracket 60 rotates, and the main box 100 coupled to the lower rail 50 through the rail bracket 70 also rotates together with the lower rail 50 such that the main box 100 is in the state of FIG. 13.

Meanwhile, when the main box 100 drawn from the luggage side trim 10 rotates about the rotating shaft 30 the hidden box 200 positioned in the hidden box accommodation space 12 moves to the main box accommodation space 11 by a movement of the hidden box connection link 310, such that the hidden box 200 is externally exposed through the opening 13 of the luggage side trim 10.

In addition, the main box connection link 330 and the main box extension link 350 are rotated and unfolded so that the main box connection link 330 and the main box extension link 350 are formed in a straight line when the main box 100 rotates, and the main moving box 120 moves linearly with respect to the main box housing no to partially protrude from the main box housing 110.

Since the accommodation operation is opposite to the operation described above, the description thereof will be omitted.

Figure 14:
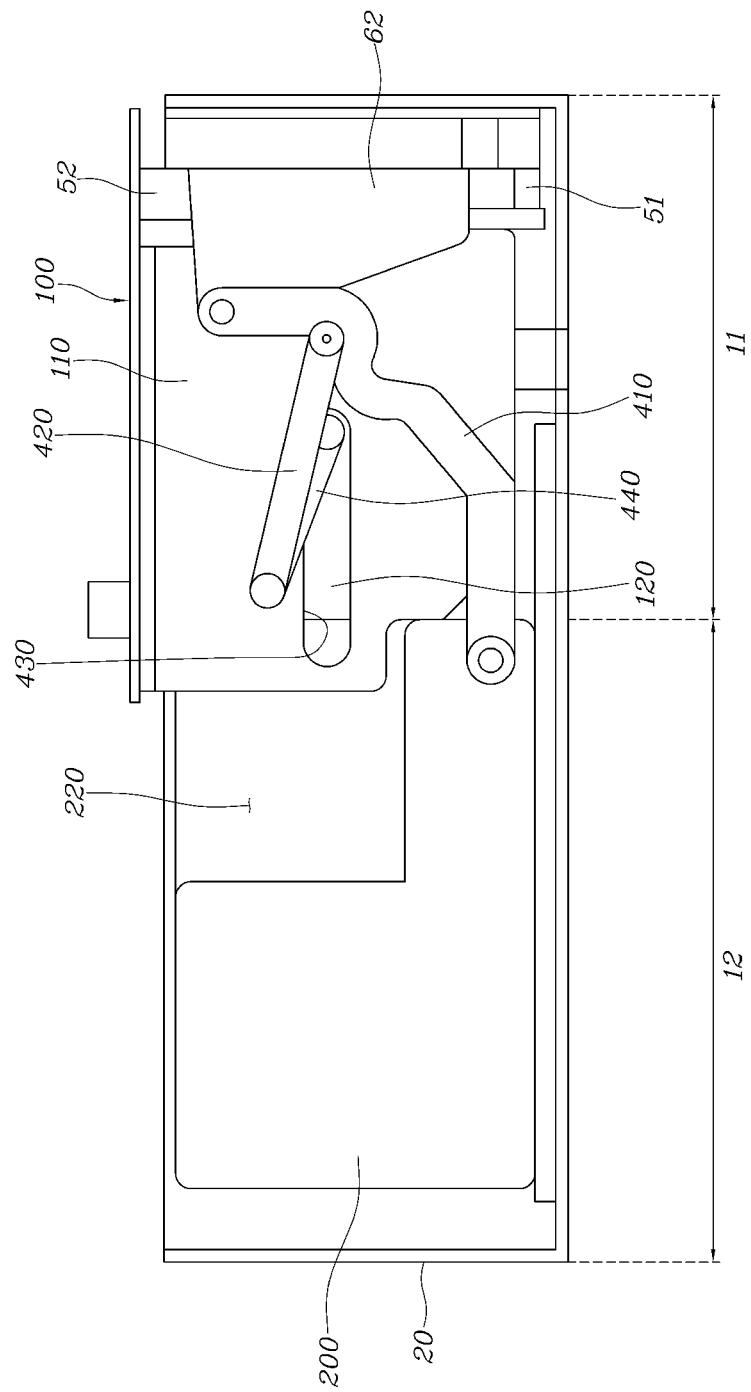
FIGS. 14 to 16 are views for describing components of another embodiment provided at a lower portion of a main box.
Figure 15:
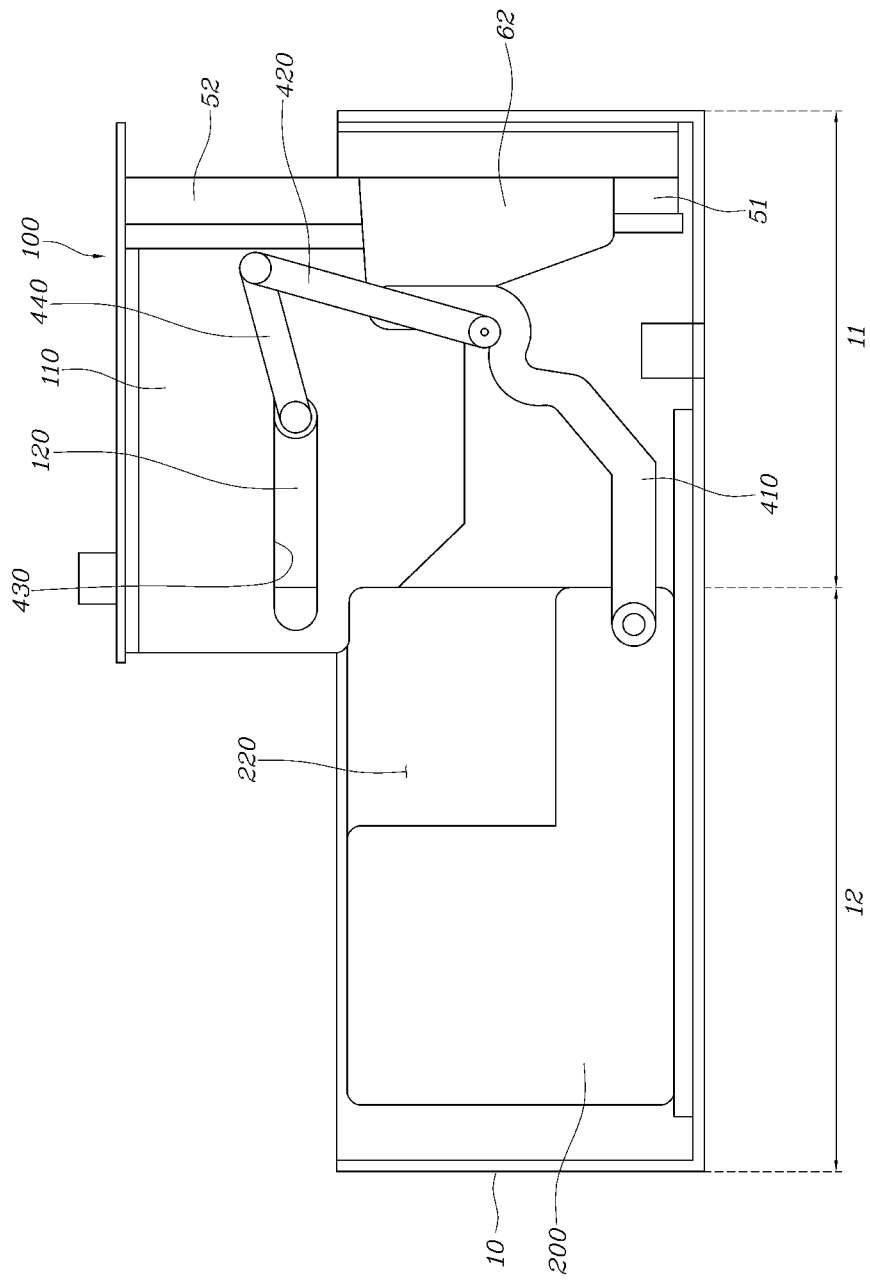
Figure 16:
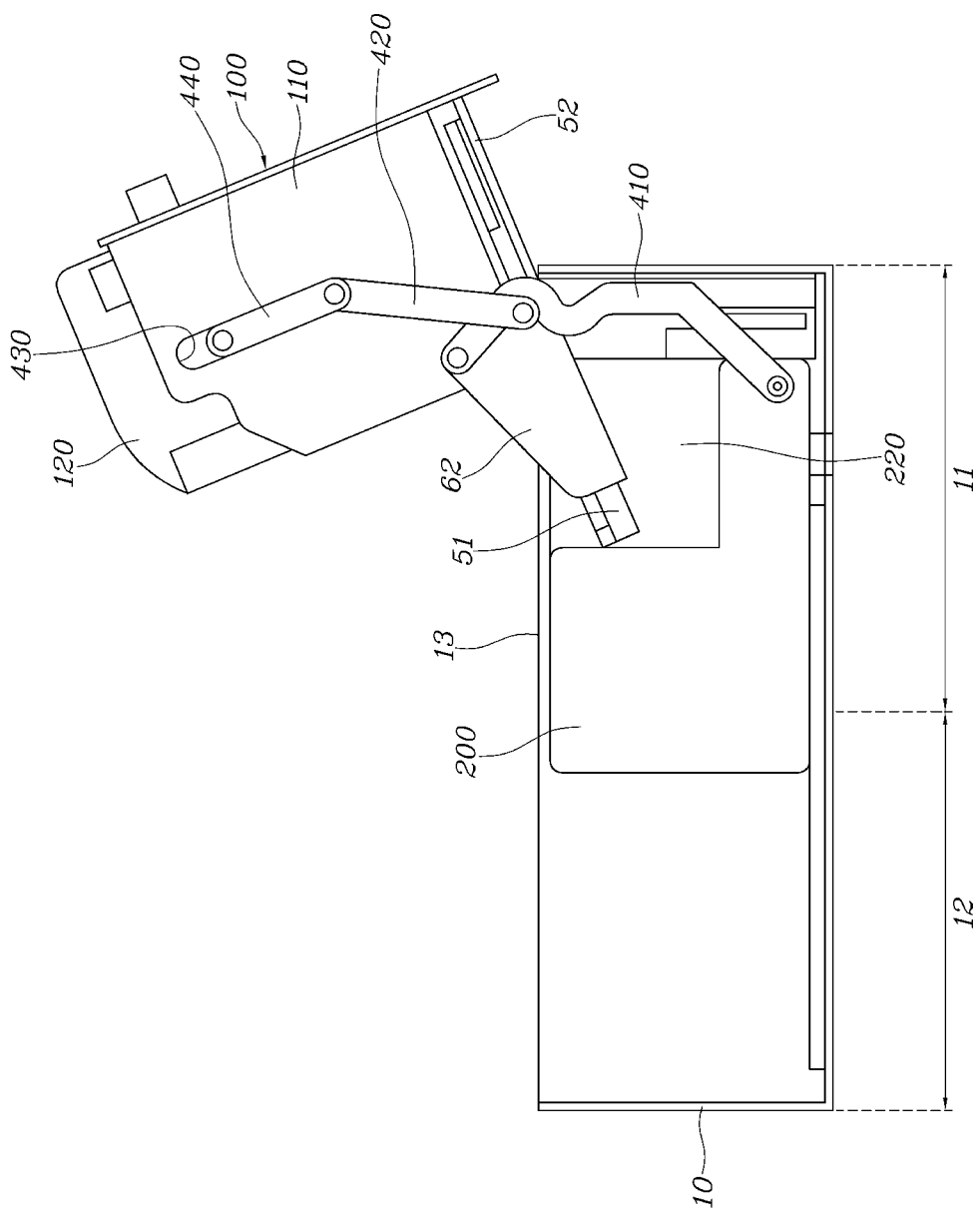

FIGS. 14 to 16 illustrate components of another embodiment provided at the lower portion of the main box 100.

As illustrated, the luggage box apparatus for a vehicle further includes: a hidden box connection link 410 having both ends rotatably hinge-coupled to the lower surface of the hidden box 200 and the lower bracket 62 constituting the center hinge bracket 60; a main box connection link 420 having one end rotatably hinge-coupled to the hidden box connection link 410; a housing guide hole 430 formed in the main box housing 110 to be extended in a direction in which the main moving box 120 moves with respect to the main box housing 110 constituting the main box 100; and a main box extension link 440 having one end rotatably hinge-coupled to the other end of the main box connection link 420 and the other end penetrating through the housing guide hole 430 and rotatably hinge-coupled to the main moving box 120.

The hidden box connection link 410 having a W shape which is bent several times is illustrated by way of example.

In the state where the main box 100 and the hidden box 200 are accommodated in the luggage side trim 10 as illustrated in FIG. 14, when a user presses and operates the main box 100, the locked state of the main box 100 is released, such that the lower moving rail 52 moves along the lower fixed rail 51 by a spring force, and the main box 100 connected to the lower fixed rail 51 through the rail bracket 70 slides in a linear direction, such that the main box 100 is in a state where it is drawn from the luggage side trim 10, as illustrated in FIG. 15.

When the main box 100 slides linearly, the main box connection link 420 rotates with respect to the hidden box connection link 410, the main box extension link 440 also rotates by the rotation of the main box connection link 420, and in a case where the main box 100 slides linearly, such that the main box 100 is in a state where it is drawn from the luggage side trim 10, an acute angle between the main box connection link 420 and the main box extension link 440 is kept.

Even though the main box 100 slides in the linear direction, such that the main box 100 is in the state where the main box 100 is drawn from the luggage side trim 10, the hidden box 200 is kept in a state where the hidden box 200 is positioned in the hidden box accommodation space 12 of the luggage side trim 10.

When the user pushes the main box 100 drawn from the luggage side trim 10, the center hinge bracket 60 rotates about the rotating shaft 30, the lower rail 50 coupled to the lower bracket 62 rotates together with the center hinge bracket 60 when the center hinge bracket 60 rotates, and the main box 100 coupled to the lower rail 50 through the rail bracket 70 also rotates together with the lower rail 50, such that the main box 100 is in the state of FIG. 16.

Meanwhile, when the main box 100 drawn from the luggage side trim 10 rotates about the rotating shaft 30, the hidden box 200 positioned in the hidden box accommodation space 12 moves to the main box accommodation space 11 by a movement of the hidden box connection link 410, such that the hidden box 200 is externally exposed through the opening 13 of the luggage side trim 10.

In addition, the main box connection link 420 and the main box extension link 440 are rotated and unfolded so that the main box connection link 420 and the main box extension link 440 are formed in a straight line when the main box 100 rotates, and the main moving box 120 moves linearly with respect to the main box housing no by such an operation to partially protrude from the main box housing 110.

Since the accommodation operation is opposite to the operation described above, the description thereof will be omitted.

The main box connection link 330 of an embodiment illustrated in FIGS. 10 to 13 and the main box connection link 420 of another embodiment illustrated in FIGS. 14 to 16 are different from each other in that the main box connection link 330 is a component which reciprocates in a linear direction and the main box connection link 420 is a component which rotates.

Figure 17:
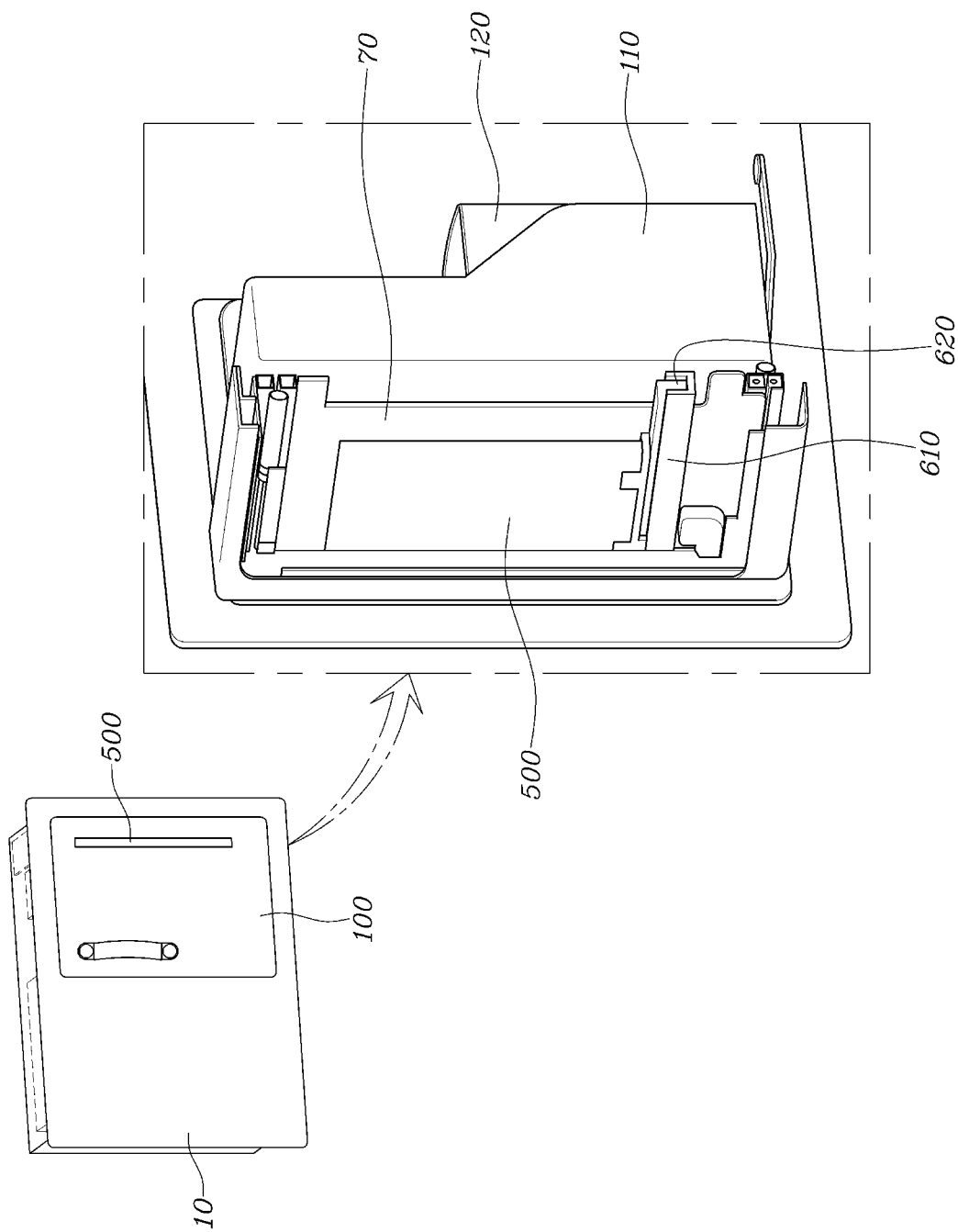
FIGS. 17 to 19 are views for describing a holder according to the present disclosure.
Figure 18:
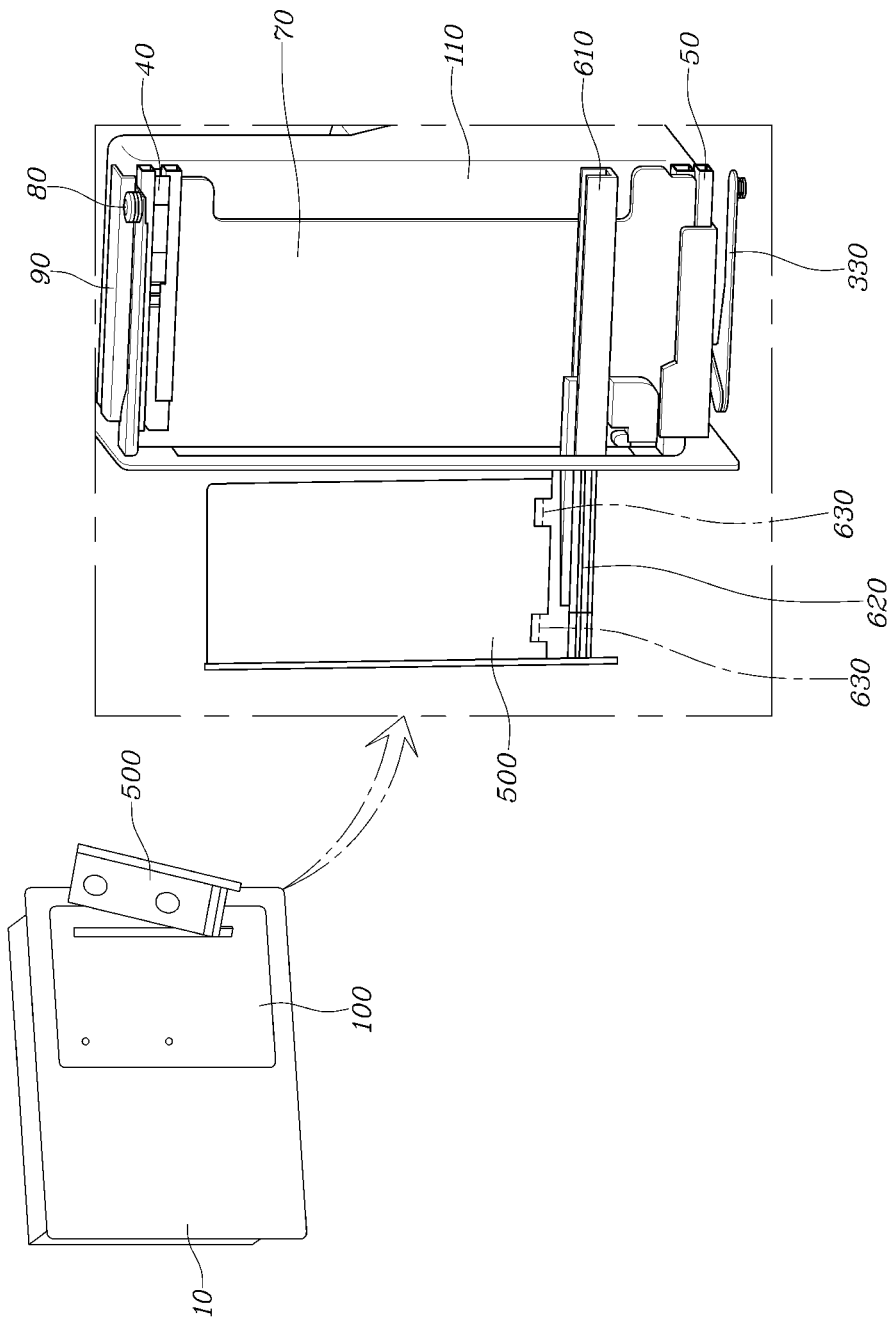
Figure 19:
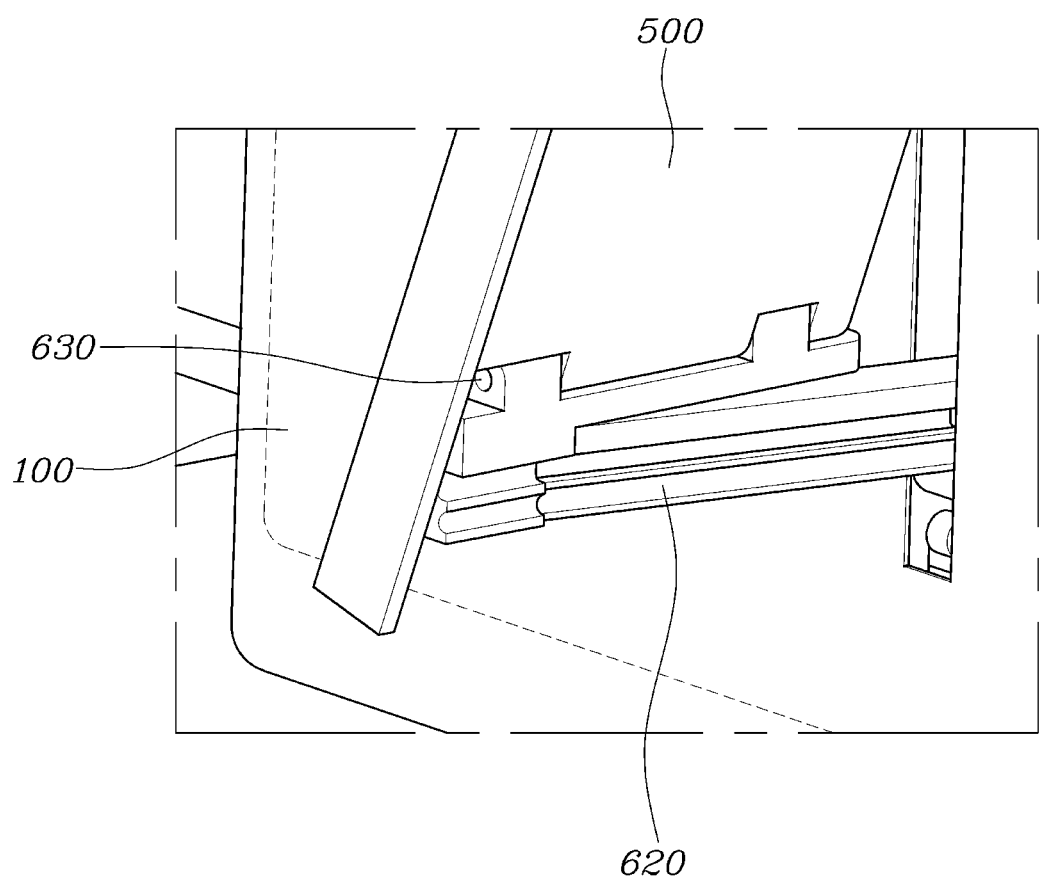

A holder 500 on which a tablet PC may be put is illustrated in FIGS. 17 to 19. The holder 500 is inserted into the luggage side trim 10 through the main box 100 and stored inside the luggage side trim 10 and may protrude outwardly of the luggage side trim 10 to be used, if necessary.

To this end, the luggage box apparatus for a vehicle further includes: a holder fixing rail 610 fixedly coupled to the rail bracket 70 in the direction in which the main box 100 slides linearly with respect to the luggage side trim 10; and a holder moving rail 620 moving along the holder fixing rail 610 and coupled to the holder 500. The holder 500 is rotatably coupled to the holder moving rail 620 through a hinge shaft 630 so that an angle between the holder 500 and the holder moving rail 620 may be adjusted.

In an embodiment of the present disclosure, as illustrated in FIG. 2, the main box 100 is positioned between a front seat 710 and a rear seat 720, the hidden box 200 is positioned behind the main box 100, the main box 100 drawn from the luggage side trim 10 rotates forward, and the hidden box 200 moves to the main box accommodation space 11 positioned in front of the hidden box 200 to be externally exposed through the opening 13 of the luggage side trim 10 when the main box 100 rotates.

The structure as in FIG. 2 may be suitably used in a structure in which a passenger seated in the rear seat 720 operates the main box 100.

Figure 20A:
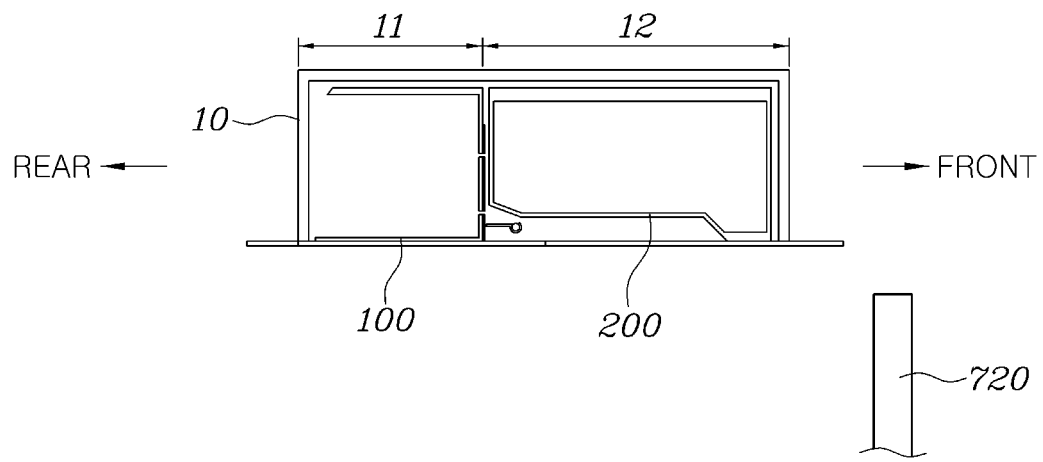
FIGS. 20A to 20C are views of a luggage box apparatus for a vehicle positioned behind a rear seat according to another embodiment of the present disclosure.
Figure 20B:
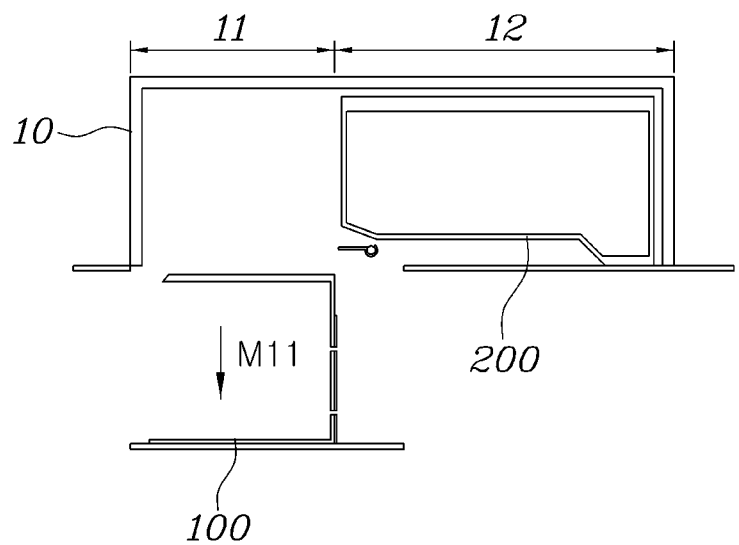
Figure 20C:
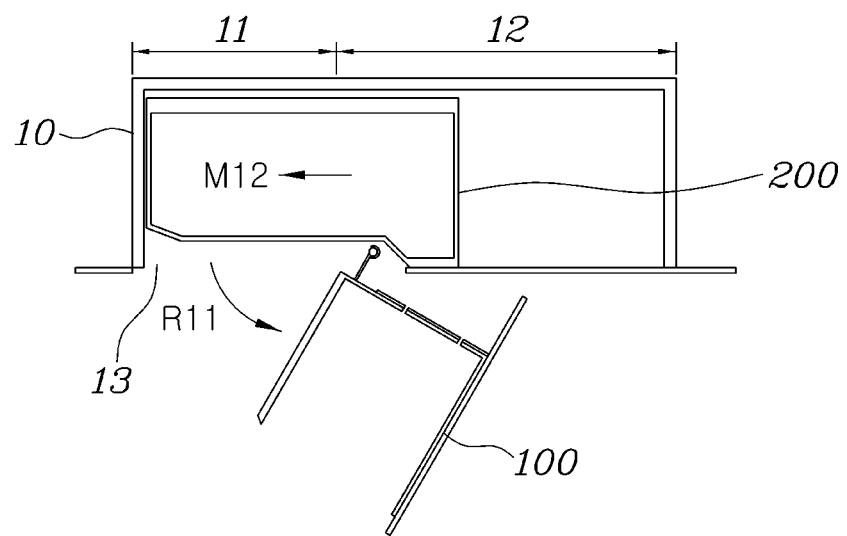

In another embodiment of the present disclosure, as illustrated in FIG. 20, the main box 100 is positioned behind the rear seat 720, the hidden box 200 is positioned in front of the main box 100, the main box 100 drawn from the luggage side trim 10 rotates forward, and the hidden box 200 moves to the main box accommodation space 11 positioned behind the hidden box 200 and is externally exposed through the opening 13 of the luggage side trim 10 when the main box 100 rotates.

The structure as in FIG. 20 may be suitably used in a structure in which the main box 100 is operated at the rear of a vehicle after a trunk lid is opened.

As set forth above, according to an embodiment of the present disclosure, since items may be accommodated and stored by utilizing the main box 100 and the hidden box 200, an amount of items to be stored may be increased, which improves accommodability.

In addition, according to an embodiment of the present disclosure, the hidden box 200 may be accommodated and stored by utilizing an unused space of a side portion of the luggage room, resulting in a significant improvement in accommodability.

In addition, according to an embodiment of the present disclosure, even though a net is not used unlike in the related art, separation of the items accommodated in the main box 100 and the hidden box 200 may be prevented, resulting in cost reduction.

In addition, according to an embodiment of the present disclosure, only lines of the main box 100 are visible from the outside when the main box 100 and the hidden box 200 are accommodated in the luggage side trim 10, such that exposure may be minimized in an accommodated state and improvement of aesthetic appearance due to the minimized exposure may be realized.

Although the present disclosure has been shown and described with respect to specific embodiments, it will be obvious to those skilled in the art that the present disclosure may be variously modified and altered without departing from the spirit and scope of the present disclosure as defined by the following claims.

What is claimed is:

1. A luggage box apparatus for a vehicle, the luggage box apparatus comprising:
    a main box installed to be accommodated in and be drawn from a luggage side trim; and
    a hidden box connected to the main box so that the hidden box is operated together with the main box, the hidden box being disposed in a row with the main box when the main box is accommodated in the luggage side trim, and is movable to a main box accommodation space to be externally exposed when the main box drawn from the luggage side trim rotates.

2. The luggage box apparatus for a vehicle of claim 1, wherein the main box includes:
    a main box housing capable of sliding linearly and rotating with respect to the luggage side trim; and
    a main moving box provided to be positioned in the main box housing and be linearly movable, the main moving box configured to be operated so as to protrude from the main box housing or to be inserted into the main box housing when the main box housing rotates.

3. The luggage box apparatus for a vehicle of claim 2, further comprising:
    a center frame fixedly installed at one side of the main box accommodation space in the luggage side trim;
    a rotating shaft traversing the center frame in a vertical direction and having opposite ends coupled to the center frame;
    an upper rail and a lower rail coupled to an upper portion and a lower portion of the main box, respectively, the upper rail and the lower rail configured to guide linear sliding of the main box; and
    a center hinge bracket rotatably coupled to the rotating shaft and connecting the upper rail and the lower rail to each other.

4. The luggage box apparatus for a vehicle of claim 3, wherein the upper rail includes an upper fixed rail and an upper moving rail, and the lower rail includes a lower fixed rail and a lower moving rail; and
    wherein the center hinge bracket includes an upper bracket coupled to the upper fixed rail and a lower bracket coupled to the lower fixed rail.

5. The luggage box apparatus for a vehicle of claim 4, further comprising a rail bracket coupled to the upper moving rail and the lower moving rail so as to connect the upper moving rail and the lower moving rail to each other in the rail bracket, and the rail bracket and the main box housing are coupled to each other.

6. The luggage box apparatus for a vehicle of claim 5, further comprising a holder operated to be inserted into the luggage side trim through the main box and protrude outwardly of the luggage side trim.

7. The luggage box apparatus for a vehicle of claim 6, further comprising:

a holder fixing rail fixedly coupled to the rail bracket in a direction in which the main box slides linearly with respect to the luggage side trim; and a holder moving rail moving along the holder fixing rail and coupled to the holder, wherein the holder is rotatably hinge-coupled to the holder moving rail so that an angle between the holder and the holder moving rail is adjustable.

8. The luggage box apparatus for a vehicle of claim 4, wherein a guide roller is rotatably coupled to the upper moving rail, and wherein a roller guide is fixedly coupled to the center frame, the roller guide configured to guide a movement of the guide roller while being in contact with the guide roller when the upper moving rail moves along the upper fixed rail.

9. The luggage box apparatus for a vehicle of claim 8, wherein a circular groove for limiting a movement of the upper moving rail is formed at one end of the guide roller as the guide roller is inserted into the one end of the guide roller; and wherein the guide roller is configured to move along the circular groove while being in contact with the circular groove when the center hinge bracket coupled to the upper rail rotates about the rotating shaft.

10. The luggage box apparatus for a vehicle of claim 4, wherein a concave upper avoidance groove and a concave lower avoidance groove are formed in an upper surface and a lower surface of the hidden box, respectively; and when the center hinge bracket rotates about the rotating shaft, a portion of the upper fixed rail and a portion of the upper bracket are inserted into the upper avoidance groove, and a portion of the lower fixed rail and a portion of the lower bracket are inserted into the lower avoidance groove, to avoid interference with the hidden box.

11. The luggage box apparatus for a vehicle of claim 4, further comprising:

a hidden box connection link having ends rotatably hinge-coupled to a lower surface of the hidden box and the lower bracket;

a side trim guide hole formed in a bottom of the luggage side trim corresponding to the main box accommodation space to be extended in a direction in which the main box slides linearly;

a main box connection link having one end inserted into the side trim guide hole to be movable along the side trim guide hole;

a housing guide hole formed in the main box housing to be extended in a direction in which the main moving box moves with respect to the main box housing; and a main box extension link having one end rotatably hinge-coupled to the main box connection link and the other end penetrating through the housing guide hole and rotatably hinge-coupled to the main moving box.

12. The luggage box apparatus for a vehicle of claim 11, wherein the hidden box is positioned in a hidden box accommodation space of the luggage side trim when the main box slides linearly with respect to the luggage side trim to be accommodated in and be drawn from the luggage side trim as the main box connection link moves along the side trim guide hole; and the luggage box apparatus being configured so that when the main box drawn from the luggage side trim rotates as the center hinge bracket rotates about the rotating shaft, the hidden box positioned in the hidden box accommodation space moves to the main box accommodation space by a movement of the hidden box connection link, such that the hidden box is externally exposed through an opening of the luggage side trim, the main box connection link and the main box extension link are rotated and unfolded so that the main box connection link and the main box extension link are formed in a straight line, and the main moving box moves linearly with respect to the main box housing to partially protrude from the main box housing.

13. The luggage box apparatus for a vehicle of claim 4, further comprising:

a hidden box connection link having ends rotatably hinge-coupled to a lower surface of the hidden box and the lower bracket;

a main box connection link having one end rotatably hinge-coupled to the hidden box connection link;

a housing guide hole formed in the main box housing to be extended in a direction in which the main moving box moves with respect to the main box housing; and a main box extension link having one end rotatably hinge-coupled to the other end of the main box connection link and the other end penetrating through the housing guide hole and rotatably hinge-coupled to the main moving box.

14. The luggage box apparatus for a vehicle of claim 13, wherein the hidden box is positioned in a hidden box accommodation space of the luggage side trim, and the main box connection link and the main box extension link can rotate at an acute angle for a linear movement of the main box when the main box slides linearly with respect to the luggage side trim to be accommodated in and be drawn from the luggage side trim; and the luggage box apparatus being configured so that when the main box drawn from the luggage side trim rotates as the center hinge bracket rotates about the rotating shaft, the hidden box positioned in the hidden box accommodation space moves to the main box accommodation space by a movement of the hidden box connection link, such that the hidden box is externally exposed through an opening of the luggage side trim, the main box connection link and the main box extension link are rotated and unfolded so that the main box connection link and the main box extension link are formed in a straight line, and the main moving box moves linearly with respect to the main box housing to partially protrude from the main box housing.

15. The luggage box apparatus for a vehicle of claim 1, wherein the main box is positioned in front of a seat, wherein the hidden box is positioned behind the main box;

wherein the main box drawn from the luggage side trim can rotate forward; and wherein the hidden box is movable to the main box accommodation space positioned in front of the hidden box to be externally exposed through an opening of the luggage side trim when the main box rotates.

16. The luggage box apparatus for a vehicle of claim 1, wherein the main box is positioned behind a seat, wherein the hidden box is positioned in front of the main box;

wherein the main box drawn from the luggage side trim can rotate forward; and wherein the hidden box is movable to the main box accommodation space positioned behind the hidden box to be externally exposed through an opening of the luggage side trim when the main box rotates.

* * * * *